(12) United States Patent
Yu et al.

(10) Patent No.: US 9,510,371 B2
(45) Date of Patent: Nov. 29, 2016

(54) METHOD AND APPARATUS FOR CONTROLLING SERVICE TRANSMISSION

(71) Applicant: Huawei Technologies Co., Ltd., Shenzhen, Guangdong (CN)

(72) Inventors: Ze Yu, Nanjing (CN); Xinyu Ge, Nanjing (CN); Haifeng Duan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/289,283

(22) Filed: May 28, 2014

(65) Prior Publication Data

US 2014/0269513 A1    Sep. 18, 2014

Related U.S. Application Data

(63) Continuation of application No. PCT/CN2013/071579, filed on Feb. 8, 2013.

(30) Foreign Application Priority Data

May 15, 2012   (CN) ................. PCT/CN2012/075533

(51) Int. Cl.
  *H04W 4/00* (2009.01)
  *H04W 76/02* (2009.01)
  *H04L 29/08* (2006.01)

(52) U.S. Cl.
  CPC .............. *H04W 76/02* (2013.01); *H04L 67/00* (2013.01); *H04L 67/303* (2013.01)

(58) Field of Classification Search
  CPC .................. H04W 76/02; H04L 67/00; H04L 67/203; H04L 12/66; H04L 67/303

USPC .......................................................... 370/328
See application file for complete search history.

(56) References Cited

U.S. PATENT DOCUMENTS

| 6,625,141 | B1 | 9/2003 | Glitho et al. |
| 2002/0067732 | A1* | 6/2002 | Roy ................. H04L 29/06027 370/401 |
| 2003/0208371 | A1 | 11/2003 | McGrath |
| 2008/0317238 | A1 | 12/2008 | Cai et al. |

(Continued)

FOREIGN PATENT DOCUMENTS

| CN | 1571341 A | 1/2005 |
| CN | 101754089 A | 6/2010 |

(Continued)

*Primary Examiner* — Sai-Ming Chan
(74) *Attorney, Agent, or Firm* — Leydig, Voit & Mayer, Ltd.

(57) ABSTRACT

A method and a device for controlling service transmission can implement service forwarding. The method includes: receiving a connection request message, where the connection request message includes user information; determining value-added service system VAS information according to the user information; receiving a first data packet of the service that is sent by a sending end; obtaining, according to the VAS information, a second data packet from the at least one destination VAS; and sending the second data packet to a receiving end. A VAS performs value-added processing on a data packet, and returns the data packet to a gateway device, allowing the gateway device to perform service arrangement flexibly according to dynamic information about a user.

16 Claims, 12 Drawing Sheets

(56) References Cited

U.S. PATENT DOCUMENTS

| | | | |
|---|---|---|---|
| 2009/0113502 A1* | 4/2009 | Chen | H04L 12/66 |
| | | | 725/110 |
| 2010/0299450 A1 | 11/2010 | Mendell | |
| 2013/0246164 A1* | 9/2013 | Khanna | G06Q 30/0267 |
| | | | 705/14.45 |

FOREIGN PATENT DOCUMENTS

| | | |
|---|---|---|
| EP | 0726682 A2 | 8/1996 |
| WO | 2012126423 A2 | 9/2012 |

* cited by examiner

METHOD AND APPARATUS FOR CONTROLLING SERVICE TRANSMISSION

CROSS-REFERENCE TO RELATED APPLICATIONS

This application is a continuation of International Patent Application No. PCT/CN2013/071579, filed on Feb. 8, 2013, which claims priority to International Patent Application No. PCT/CN2012/075533, filed on May 15, 2012, both of which are hereby incorporated by reference in their entireties.

TECHNICAL FIELD

The present invention relates to the field of communications, and in particular, to a method and an apparatus for controlling service transmission.

BACKGROUND

While providing a communications service for a user, certain telecommunications operators release some packages related to the service. If the user subscribes to a package, the service of the user is forwarded to a value-added service system (VAS, Value Added System) corresponding to the package for value-added processing. If the user does not subscribe to a package, a service request of the user is directly forwarded to a service server (network side) without being processed by the value-added service system. Therefore, services of different users need to be forwarded to different value-added service systems according to package subscription relationships of the users.

At present, one technical solution is known, that is, a network access server (NAS, Network Access Server) device, for example, a gateway general packet radio service support node (GGSN, Gateway GPRS Support Node), a packet data serving node (PDSN, Packet Data Serving Network), a broadband remote access server (BRAS, Broadband Remote Access Server), and the like, or an authentication, authorization, and accounting service (AAA, Authentication Authorization and Accounting) server determines a routing policy according to user subscription information, that is, allocates different Internet Protocol address pools (IP Pool, Internet Protocol Pool) for different users, for example, allocates IP Pool1 that indicates VAS1 to a service of a user who subscribes to a value-added service processed by VAS1, allocates IP Pool2 that indicates VAS2 to a service of a user who subscribes to a value-added service processed by VAS2, and allocates IP Pool3 that indicates VAS 3 to a service of a user who subscribes to a value-added service processed by VAS 3. A router device (switch device) performs policy-based routing according to a source IP address (the foregoing IP Pool) of a service and forwards a data packet of the service to different VASs for processing. After a VAS performs value-added processing on the data packet, the VAS directly sends the data packet to a piece of user equipment, a network side, or another VAS.

Therefore, in the foregoing technical solution, in a case that a user subscribes to a value-added service processed by multiple VASs, or a value-added service subscribed by a user changes with a trigger condition, service arrangement cannot be performed for the value-added service in each VAS.

SUMMARY

Embodiments of the present invention provide a method and an apparatus for controlling service transmission, which enriches communications services while saving communications resources to a certain extent.

According to one aspect, a method for controlling service transmission is provided and includes: receiving a connection request message sent by a piece of user equipment that transmits a service, where the connection request message contains user information of the user equipment; determining value-added service system VAS information according to the user information, where the VAS information is used to indicate at least one destination VAS of the service; receiving a first data packet of the service sent by a sending end; obtaining, according to the VAS information, a second data packet from the at least one destination VAS, where the second data packet is a data packet obtained after the at least one destination VAS performs value-added processing on the first data packet; and sending the second data packet to a receiving end.

According to another aspect, a method for controlling service transmission is provided and includes: receiving a first data packet sent by a gateway device; generating a second data packet by performing value-added processing on the first data packet; and sending the second data packet to the gateway device.

According to still another aspect, an apparatus for controlling service transmission is provided and includes: a receiving unit, configured to receive a connection request message sent by a piece of user equipment that transmits a service, where the connection request message includes user information of the user equipment; a determining unit, configured to determine value-added service system VAS information according to the user information, where the VAS information is used to indicate at least one destination VAS of the service; the receiving unit is further configured to receive a first data packet of the service that is sent by a sending end; an obtaining unit, configured to obtain a second data packet from the at least one destination VAS according to the VAS information, where the second data packet is a data packet obtained after the at least one destination VAS performs value-added processing on the first data packet; and a sending unit, configured to send the second data packet to a receiving end.

In the method and apparatus for controlling service transmission in the embodiments of the present invention, a VAS performs value-added processing on a data packet, and returns the data packet to a gateway device, allowing the gateway device to perform service arrangement flexibly according to dynamic information about a user.

According to yet another aspect of an implementation manner of the present invention, a communications service processing method is provided and includes:

receiving, by a system for controlling service transmission, communication data sent by a piece of user equipment, where the communication data carries information about an original destination server, which is referred to as a receiving section;

obtaining, according to the communication data, any one or any combination of dynamic information about a user sending the communication data, and service layer information of the communication data, which is referred to as an obtaining section;

determining a forwarding policy according to the obtained any one or any combination of the dynamic information about the user and the service layer information, where the forwarding policy includes: forwarding service data corresponding to the communication data to at least one service server, and the at least one service server is different from an original destination server carried in the communication data, which is referred to as a forwarding policy determining section; and sending the service data corresponding to the communication data to the at least one service server, receiving the service data processed by the at least one service server, and sending the received service data that has been processed to the original destination server carried in the communication data, which is referred to as a control executing section.

According to another aspect of an implementation manner of the present invention, a system for controlling service transmission is provided and includes: a receiving module (M100), an obtaining module (M200), a forwarding policy determining module (M300), and a control executing module (M400), where the modules connect to and communicate with each other, the receiving module (M100) is configured to receive communication data sent by a piece of user equipment, where the communication data carries information about an original destination server;

the obtaining module (M200) is configured to obtain, according to the communication data, any one or any combination of dynamic information about a user of the user equipment and service layer information of the communication data;

the forwarding policy determining module (M300) is configured to determine a forwarding policy according to the obtained any one or any combination of the dynamic information about the user and the service layer information, where the forwarding policy includes: forwarding service data sent by the user equipment to at least one service server, and the at least one service server is different from the original destination server carried in the communication data; and the control executing module (M400) is configured to control and execute the following procedure: sending the service data sent by the user equipment to the at least one service server, receiving the service data processed by the at least one service server, and sending the received service data that has been processed to the original destination server carried in the communication data.

For the implementation manner of the communications service processing method and the implementation manner of a system for controlling service transmission, in a specific example, the system for controlling service transmission is a PCC system, and a dynamic rule interface or a static rule interface is used between a PCEF and a PCRF in the PCC system.

For the implementation manner of the communication service processing method, the implementation manner of a system for controlling service transmission, and the specific implementation manner of the PCC system as the system for controlling service transmission, in a more specific implementation manner, the dynamic information about the user includes one or any combination of the following information: a phone number of the user, an IMSI of the user, an IP address of the user, service subscription information of the user, and a bearer type of a current network; the service layer information includes one or any combination of the following information: service-related L7 layer or L7+ layer information. By using the foregoing method or system, the system for controlling service transmission may perform service control and processing flexibly for a service according to the dynamic information about the user or the service layer information, and in particular, forward a service to a service server other than the original destination service server, enriching communications services while avoiding repeated transmission of oversize communication data. In particular, the user equipment does not need to send related service data to different service servers at multiple times, saving communications resources to some extent and improving communication efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM, Global System for Mobile communication), a Code Division Multiple Access (CDMA, Code Division Multiple Access) system, Wideband Code Division Multiple Access (WCDMA, Wideband Code Division Multiple Access Wireless), General Packet Radio Service (GPRS, General Packet Radio Service), Long Term Evolution (LTE, Long Term Evolution), and the like.

A piece of user equipment (UE, User Equipment), also known as a mobile terminal, a piece of mobile user equipment, and on the like, may communicate with one or more core networks through a wireless access network (for example, RAN, Radio Access Network). The user equipment may be a mobile terminal, such as a mobile phone (also known as a "cellular" phone), and a computer equipped with a mobile terminal. For example, the user equipment may be a portable, pocket-type, handheld, computer built-in or vehicle-mounted mobile apparatus, which exchanges language and/or data with the wireless access network.

A policy decision server may be deployed outside a gateway device, independent of the gateway device.

A gateway device may include a GGSN, a PDSN, a Wimax Access Service Network (WASN, Wimax Access Service Network), and the like. It should be understood that a gateway device of the embodiments of the present invention may further include a network element that may implement a service centralization and convergence point and may implement parsing and control of content of a service flow accessed by a terminal user on another network.

In addition, in a policy and charging control (PCC, Policy and Charging Control) architecture, an entity of a policy and charging enforcement function (PCEF, Policy and Charging Enforcement Function) is a part of the gateway device and is used to implement functions of service detecting, policy executing, and traffic-based charging.

An entity of a policy and charging rule function (PCRF, Policy and Charging Rule Function) may receive, from the PCEF, an input used for implementing functions of policy control decision-making and traffic-based charging control, provide the PCEF with network control functions related to service data flow detecting, gating control, and traffic-based charging (except credit control), and make a PCC decision with reference to customized information of the PCRF.

Figure 1:
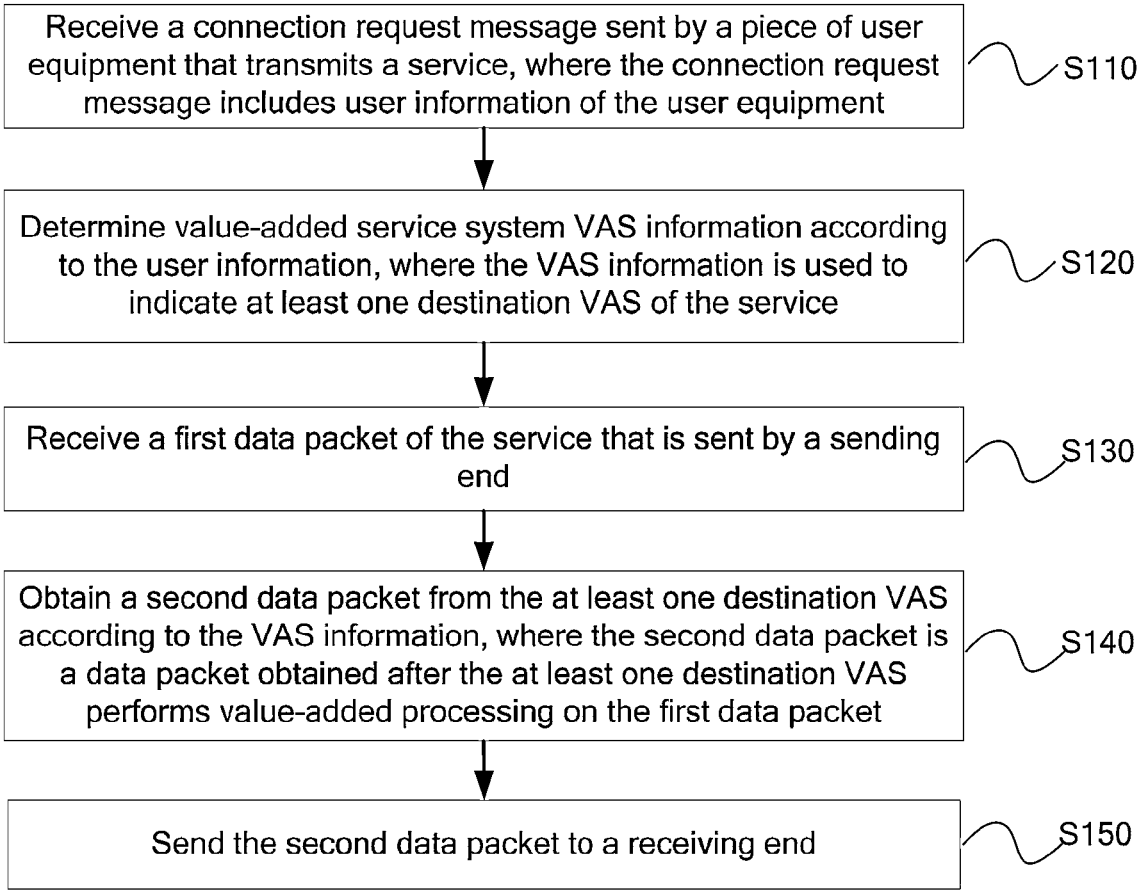
FIG. 1 is a schematic flowchart of a method for controlling service transmission according to an embodiment of the present invention.

FIG. 1 shows a schematic flowchart of a method 100 for controlling service transmission according to an embodiment of the present invention from a perspective of a gateway device side. As shown in FIG. 1, the method 100 includes:

S110: Receive a connection request message sent by a piece of user equipment that transmits a service, where the connection request message includes user information of the user equipment.

S120: Determine value-added service system VAS information according to the user information, where the VAS information is used to indicate at least one destination VAS of the service.

S130: Receive a first data packet of the service that is sent by a sending end.

S140: Obtain, according to the VAS information, a second data packet from the at least one destination VAS, where the second data packet is a data packet obtained after the at least one destination VAS performs value-added processing on the first data packet.

S150: Send the second data packet to a receiving end.

Specifically, in the foregoing step S110, the UE may send a Remote Authentication Dial In User Service charging start (Radius Accounting-Start, Radius Remote Authentication Dial In User Service Accounting-Start) request message to a gateway device after getting online, and the Radius Accounting-Start request message may carry user information (for example, a phone number or the like) of the UE. The gateway device may query, according to the user information, subscription information corresponding to the user information from a subscription information list obtained in advance.

In the foregoing step S120, the gateway device may determine a VAS forwarding rule (for example, VAS information that needs to be sent and corresponds to the subscription information) corresponding to a service of the UE, where specific rule content (VAS information) may include a VAS identifier ID, a virtual local area network VLAN ID of the VAS, and an Internet Protocol IP address of the VAS. The VLAN ID of the VAS may include an uplink virtual local area network identifier (Uplink-VLAN ID) and a downlink virtual local area network identifier (Downlink-VLAN ID). The IP address of the VAS may include an uplink Internet Protocol (Uplink-VAS IP) address (used to indicate a gateway address and host byte order of a next hop when an uplink service flow is sent to the VAS) and a downlink Internet Protocol (Downlink-VAS IP) address (used to indicate a gateway address and host byte order of a next hop when a downlink service flow is sent to the VAS).

Optionally, in the embodiment of the present invention, the method further includes:

obtaining status information that is used to indicate service status of the service; and the determining VAS information according to the user information includes:

determining the VAS information according to the user information and the status information.

Optionally, in the embodiment of the present invention, the status information includes time information used to indicate the current time and/or bearer information used to indicate a current bearer network of the service.

Specifically, a case that transmission of a value-added service subscribed by a UE may change with the current service status exists. For example, a UE subscribes to a package, and a data packet of the UE needs to be forwarded to an online antivirus platform (VAS) within a specified time period (for example, 8 am-8 pm). If the UE gets online between 08:00 am and 08:00 pm and transmits data to a network side, a gateway device may query, according to a phone number of a user and the current time, subscription information of the UE and determine a VAS forwarding rule of forwarding a data packet of the UE to the online antivirus platform. If the UE gets online between 08:00 pm and 08:00 am and transmits data to the network side, a gateway device may query subscription information of the UE according to a phone number of a user and the current time and determine a VAS forwarding rule of directly forwarding a data packet of the UE to the network side.

For still another example, a UE subscribes to a package, and a data packet of the UE needs to be forwarded to an online antivirus platform (VAS) in 3G network mode. If a user gets online through a 3G network and transmits data to a network side, a gateway device may query, according to a phone number of the user and a bearer type (RAT-TYPE), subscription information of the UE and determine a VAS forwarding rule of forwarding a data packet of the UE to the online antivirus platform. If the user switches to a 2G network and transmits data to a network side, a gateway device may query, according to the phone number of the user and the bearer type (RAT-TYPE), subscription information of the UE and determine a VAS forwarding rule of directly forwarding a data packet of the UE to the network side.

According to the method for controlling service transmission in the embodiment of the present invention, service arrangement can be performed flexibly for a value-added service of each VAS when a value-added service subscribed by a user changes with a trigger condition.

Optionally, in the embodiment of the present invention, the determining VAS information according to the user information includes:

obtaining, according to the user information, the VAS information from a first database generated based on correspondence between the user information and the VAS information.

Optionally, in the embodiment of the present invention, the determining VAS information according to the user information and the status information includes:

obtaining, according to the user information and the status information, the VAS information from a second database generated based on correspondence between the user information and status information and the VAS information.

Specifically, after the UE subscribes to a service provided by an operator, a gateway device may synchronize subscription information of the UE from the operator, where the subscription information records a VAS forwarding rule of a service of the UE. In addition, the gateway device may generate and maintain a list that records correspondence between the user information of the user and the VAS forwarding rule (for example, recording the phone number of the user and an identifier VAS ID of a server used for implementing the service subscribed by the user). Therefore, the gateway device may determine, according to the user information, a VAS forwarding rule of the service of the UE from the list.

Optionally, in the embodiment of the present invention, the determining VAS information according to the user information includes:

sending a first policy request message that includes the user information to a policy decision server;

receiving a first policy request answer message that includes first control information and is sent by the policy decision server, where the first control information is determined by the policy decision server according to the user information and is used to indicate the VAS information; and determining the VAS information according to the first control information.

Optionally, in the embodiment of the present invention, the determining VAS information according to the user information and the status information includes:

sending a second policy request message that includes the user information and the status information to a policy decision server;

receiving a second policy request answer message that includes second control information and is sent by the policy decision server, where the second control information is determined by the policy decision server according to the user information and the status information and is used to indicate the VAS information; and determining the VAS information according to the second control information.

Specifically, limited by system resources of devices (including NAS and AAA devices) on a present network, allocating an IP address according to dynamic information about a user (for example, user subscription information, package subscription relationship, and the like) exerts a large impact on processing performance of the devices on the present network. In addition, in the foregoing technical solution, to maintain synchronization of the dynamic information about the user, a device on the present network needs to be upgraded and restructured or manually updated by a network maintenance person, rather difficult in upgrade and maintenance. Therefore, in the embodiment of the present invention, after the UE subscribes to a service provided by an operator, a policy decision server deployed outside a gateway device may synchronize subscription information of the UE from the operator, where the subscription information records a VAS forwarding rule of a service of the UE. Furthermore, the policy decision server may generate and maintain a list that records correspondence between the user information of the user and the VAS forwarding rule (for example, recording a phone number of the user and an identifier VAS ID of a server for implementing the service subscribed by the user). Therefore, after receiving a Radius Accounting-Start message sent by the UE, the gateway device may send a policy request message that includes the user information of the UE to the policy decision server. The policy decision server may determine, according to the user information, the VAS forwarding rule of the service of the UE from the list and send information that is used to indicate the VAS forwarding rule to the gateway device through a policy decision request answer message. Therefore, the gateway device determines, according to the information, the VAS forwarding rule of the service of the UE.

Furthermore, optionally, in the embodiment of the present invention, the determining the VAS information according to the first control information includes:

determining the VAS information according to a VAS information indication identifier included in the first control information; or obtaining the VAS information from the control information.

Furthermore, optionally, in the embodiment of the present invention, the determining the VAS information according to the second control information includes:

determining the VAS information according to a VAS information indication identifier included in the second control information; or obtaining the VAS information from the second control information.

Specifically, a dynamic rule interface may be used between a PCRF and a PCEF in a PCC architecture to implement a related solution. In specific, a policy decision server (for example, a PCRF) may deliver all forwarding rules (VAS information) to a gateway device (for example, a PCEF) through the dynamic rule interface (for example, through a Gx message). In this case, the following fields need to be added to the Gx message:

<credit control answer (CCA, Credit Control Answer) message>::=<Diameter Header: 272, PXY> (which indicates that the PCRF sends all VAS forwarding rules (VAS information) to the PCEF through a CCA message)

*[VAS-Redirect-Install] (which means to create or update a VAS redirection rule)

*[VAS-Redirect-Remove] (which means to delete a VAS redirection rule)

<(RAR, Re-Authorize Request)>::=<Diameter Header: 258, REQ, PXY> (which indicates that the PCRF sends all VAS forwarding rules (VAS information) to the PCEF through an RAA message)

*[VAS-Redirect-Install] (which means to create or update a VAS redirection rule)

*[VAS-Redirect-Remove] (which means to delete a VAS redirection rule)

VAS-Redirect-Install::=<AVP Header: 10109>

{VAS-Redirect-Rule-Name} (which indicates the name of a new/updated VAS redirection rule)

{VASID} (used to indicate a VAS identifier)

{Uplink-VLANID} (used to indicate an uplink VLAN ID)

{Downlink-VLANID} (used to indicate a downlink VLAN ID)

{Uplink-VASIP} (used to indicate an uplink VAS IP)

{Downlink-VASIP} (used to indicate a downlink VAS IP)

VAS-Redirect-Remove::=<AVP Header: 10110>

*[VAS-Redirect-Rule-Name] (which indicates the name of a deleted VAS redirection rule)

In this way, all VAS information is configured outside a gateway device, thereby minimizing an impact on performance of a network device.

Furthermore, optionally, in the embodiment of the present invention, the determining VAS information according to the control information includes:

determining the VAS information according to a VAS information indication identifier included in the control information.

Alternatively, a static rule interface may be used between the PCRF and the PCEF in the PCC architecture to implement the related solution. Specifically, VAS information described in Table 1 may be configured on the gateway device (for example, a PCEF) in advance, so that the policy decision server (for example, a PCRF) may send merely a VAS information indication identifier that is used to indicate a specified forwarding rule (VAS information). For example, a VAS redirection rule name (* VAS-Redirect-Rule-Name) in Table 1 means to activate or deactivate a certain VAS redirection rule. The gateway device (for example, a PCEF) may query, according to the * VAS-Redirect-Rule-Name, a local statically-configured forwarding rule (stored in a memory database) and obtain information about a VAS to which the service needs to be forwarded.

TABLE 1

| Field name | Field type | Field definition | Constraint |
| --- | --- | --- | --- |
| *VAS-Redirect-Rule-Name | Varchar2 (21) | Name of a VAS forwarding rule | NOT NULL |
| VAS ID | 32-bit unsigned integer (Unit32) | VAS ID | NOT NULL |
| Uplink-VLAN ID | Uint32 | Uplink VLAN ID of a VAS | NOT NULL |
| Downlink-VLAN ID | Uint32 | Downlink VLAN ID of a VAS | NOT NULL |
| Uplink-VAS IP | Uint32 | Uplink VAS IP of a VAS | NOT NULL |
| Downlink-VAS IP | Uint32 | Downlink VAS IP of a VAS | NOT NULL |

In this case, the following fields need to be added to the Gx message:

<CCA>::=<Diameter Header: 272, PXY> (which indicates that the PCRF sends all VAS forwarding rules (VAS information) to the PCEF through a CCA message)

*[VAS-Redirect-Install] (which means to create or update a VAS redirection rule)

*[VAS-Redirect-Remove] (which means to delete a VAS redirection rule)

<RAR>::=<Diameter Header: 258, REQ, PXY> (which indicates that the PCRF sends all VAS forwarding rules (VAS information) to the PCEF through an RAA message)

*[VAS-Redirect-Install] (which means to create or update a VAS redirection rule)

*[VAS-Redirect-Remove] (which means to delete a VAS redirection rule)

VAS-Redirect-Install::=<AVP Header: 10109>

{VAS-Redirect-Rule-Name} (which indicates the name of a new/updated VAS redirection rule)

*[VAS-Redirect-Rule-Name] (which indicates the name of a deleted VAS redirection rule)

In this way, specific VAS information is configured on the gateway device, so that the policy decision server can complete indication of a forwarding rule, namely, VAS information, by merely delivering indication information, thereby shortening interaction time, increasing a service access speed, and reducing an impact on user experience.

In the method for controlling service transmission in the embodiment of the present invention, a policy decision server deployed outside a gateway device determines control information of a service, and the gateway device controls service transmission according to the control information, thereby reducing an impact of service forwarding according to dynamic information about a user on performance of the gateway device, maintaining continuous update for a piece of user equipment, and reducing network maintenance workload.

In the embodiment of the present invention, a service may be sent from a UE to a network side or from a network side to a UE through a gateway device. Therefore, in the foregoing step S130, the gateway device may receive a data packet of the service that is sent by the UE or the network side (the following describes the network side by using a service provider (SP, Service Provider) as an example).

In the foregoing step S140, the gateway device may establish, according to the foregoing VAS information, a TCP link with a VAS indicated by the VAS information and send the foregoing data packet to the VAS. The VAS performs value-added processing on the data packet and returns the processed data packet to the gateway device.

Optionally, in the embodiment of the present invention, the VAS information is used to indicate at least two destination VASs of the service; and the obtaining a second data packet from the at least one destination VAS according to the VAS information includes:

sending, according to the VAS information, the first data packet to a first destination VAS;

receiving a third data packet sent by the first destination VAS, where the third data packet is a data packet obtained after the first destination VAS performs value-added processing on the first data packet;

sending, according to the VAS information, the third data packet to a second destination VAS; and receiving a data packet that is sent by the second destination VAS, and obtained after the second destination VAS performs value-added processing on the third data packet; where the data packet obtained after the second destination VAS performs value-added processing on the third data packet is the second data packet; or sending a data packet obtained after the second destination VAS performs value-added processing on the third data packet to at least another one destination VAS, so that the at least another one destination VAS performs value-added processing again on the data packet obtained after the second destination VAS performs value-added processing on the third data packet, and uses the data packet obtained after the at least one another destination VAS performs value-added processing again on the data packet, which is obtained after the second destination VAS performs value-added processing on the third data packet, as the second data packet, where the another destination VAS is a destination VAS other than the first destination VAS and the second destination VAS.

Specifically, for example, if a user subscribes to a package released by an operator to obtain a web page adaption service and a video optimization service, a gateway device may determine a VAS forwarding rule of the UE (for example, sending a data packet of the UE to a VAS that processes the web page adaption service and a VAS that processes the video optimization service) by querying, according to a phone number of the user, a locally stored VAS forwarding rule database or obtaining the VAS forwarding rule of the UE from a policy decision server.

In addition, after receiving a data packet sent by the UE, the gateway device may send, according to the VAS forwarding rule, the data packet to either the VAS that processes the web page adaption service or the VAS that processes the video optimization service (for example, the VAS that processes the web page adaption service). Specifically, each VAS is located in a different VLAN. Therefore, the PCEF may forward a service packet according to a VLAN ID of a VAS, that is, modify the VLAN ID and send a service flow through a specified VLAN. The gateway device may save an original destination address of the data packet, change a destination MAC address of the service packet to an IP address of a corresponding VAS, change a next-hop routing destination address of the data packet to an IP address of the VAS (which is the VAS processing the web page adaption service), and send the data packet to the VAS through a switch. In the following description, a method for a gateway device to send a data packet to a VAS is similar to the foregoing procedure, and therefore details are not described herein.

After performing value-added processing on the data packet, the VAS sends the data packet (the data packet obtained after web page adaption processing) back to the gateway device. Specifically, a routing policy may be configured on the VAS, that is, setting the next-hop routing destination address of the data packet to the IP address of the gateway device. In the following description, a method for a VAS to send a data packet to a gateway device is similar to the foregoing procedure, and therefore details are not described herein.

Then, the gateway device sends the data packet (the data packet obtained after web page adaption processing) to either the VAS that processes the web page adaption service or the VAS that processes the video optimization service (for example, the VAS that processes the video optimization service). After performing-value-added processing on the received data packet (the data packet obtained after web page adaption processing), the VAS sends the data packet (the data packet obtained after web page adaption processing and video optimization processing) back to the gateway device. Finally, the gateway device changes the next-hop routing destination address of the data packet (the data packet obtained after the web page adaption processing and video optimization processing) to the saved original destination address and sends the data packet to an SP.

The foregoing describes an embodiment that a UE sends a data packet to an SP through a gateway device. However, the present invention is not limited to the foregoing embodiment, and is also applicable to a case that an SP sends a data packet to a UE through a gateway device, where, under the circumstance, a sequence for forwarding the data packet to a VAS that processes a web page adaption service and a VAS that processes a video optimization service may be the same as or opposite to that in the foregoing embodiment, which is not specifically limited by the present invention.

In addition, the foregoing describes an embodiment that a gateway device forwards a data packet to two VASs in sequence. However, the present invention is not limited to the foregoing embodiment. The number of destination VASs may be determined according to UE subscription information and may not be limited.

After determining VAS information of destination VASs of a service, the PCEF may forward the data packet according to the priority information, in particular, according to priority identifiers or a sequence of the VASs in a VAS forwarding rule, that is, the VAS information may include the priority information that is used to indicate a sequence for sending the first data packet in the at least two VASs.

Specifically, in a Gx message, other than the foregoing *[VAS-Redirect-Install], *[VAS-Redirect-Remove], and *[VAS-Redirect-Rule-Name] fields, the * [Precedence] field (which indicates the forwarding priority of the VAS; if the field is not carried, it is considered that the priority is the lowest; for VASs with the same priority, the system performs forwarding in sequence according to the sequence delivered by the rule) may also be added.

Alternatively, VAS information described in Table 2 may also be configured on the gateway device, so that the PCRF may send merely indication information corresponding to a specified forwarding rule (VAS information), for example, a VAS redirection rule name (* VAS-Redirect-Rule-Name) in Table 2, and only the VAS-Redirect-Rule-Name field is delivered on a Gx interface, which means to activate or deactivate a certain VAS redirection rule. The PCEF queries a local statically-configured forwarding rule (stored in a memory database) and obtains information about a VAS to which the service needs to be forwarded.

TABLE 2

| Field name | Field type | Field definition | Constraint |
| --- | --- | --- | --- |
| *VAS-Redirect-Rule-Name | Varchar2 (21) | Name of a VAS forwarding rule | NOT NULL |
| VAS ID | 32-bit unsigned integer (Unit32) | VAS ID | NOT NULL |
| Uplink-VLAN ID | Uint32 | Uplink VLAN ID of a VAS | NOT NULL |
| Downlink-VLAN ID | Uint32 | Downlink VLAN ID of a VAS | NOT NULL |
| Uplink-VAS IP | Uint32 | Uplink VAS IP of a VAS | NOT NULL |
| Downlink-VAS IP | Uint32 | Downlink VAS IP of a VAS | NOT NULL |
| Precedence | Uint32 | Priority | OPTIONAL |

In this way, a service flow is forwarded, according to priorities defined by a VAS forwarding rule, to corresponding VAS platforms in sequence, which can flexibly implement service arrangement. Optionally, in the embodiment of the present invention, before obtaining a second data packet from at least one destination VAS, the method further includes:

sending a test message to the at least one destination VAS;
receiving a test response message sent by the at least one destination VAS; and
determining, according to the test response message, that the at least one destination VAS is effective. Specifically, in the embodiment of the present invention, a gateway device may further provide a VAS status detection capability, that is, sending an Internet Control Message Protocol (ICMP, Internet Control Message Protocol) packet to each VAS at a certain interval (the interval may be set according to a requirement). If the gateway device does not receive an ICMP response for N consecutive times (the number of times may be set according to a requirement), it is determined that the VAS is ineffective. Furthermore, optionally, for an ineffective VAS, the gateway device may send an ICMP packet again after a certain interval (the interval may be set according to a requirement). If the gateway device receives an ICMP response for N consecutive times, it may be determined that the VAS is effective. Before forwarding a service to a VAS, the PCEF first queries the status of the VAS. If the VAS is ineffective, the VAS is skipped and a service flow is forwarded to a next VAS platform until the service flow does not need to be forwarded to a VAS. Then the PCEF forwards the service to a final SP.

In this way, when a service packet needs to be forwarded, it may be immediately learned whether a destination VAS of the service is effective, thereby shortening interaction time, increasing a service access speed, and reducing an impact on user experience.

Alternatively, in the embodiment of the present invention, the PCEF, before forwarding a service to a VAS, may first send an ICMP packet to the VAS. If an ICMP response is received within a specified time period (the time period may be set according to a requirement), it may be determined that the VAS is effective. Otherwise, it is determined that the VAS is ineffective. If the VAS is ineffective, the VAS is skipped and a service flow is forwarded to a next VAS platform until the service flow does not need to be forwarded to a VAS. Then the PCEF forwards the service to an SP.

In this way, the gateway device detects status of a corresponding VAS only when necessary, which can reduce an impact on performance of the gateway device.

In the method for controlling service transmission in the embodiment of the present invention, status of a VAS is detected. If the VAS is ineffective, no data packet is forwarded to the VAS, thereby ensuring normal access to a service of a user and avoiding failure of access to the service of the user due to unavailability of a certain VAS. In the following description, as an example instead of a limitation, a policy decision server is described by using a PCRF as an example, and a gateway device is described by using a PCEF as an example.

Figure 2:
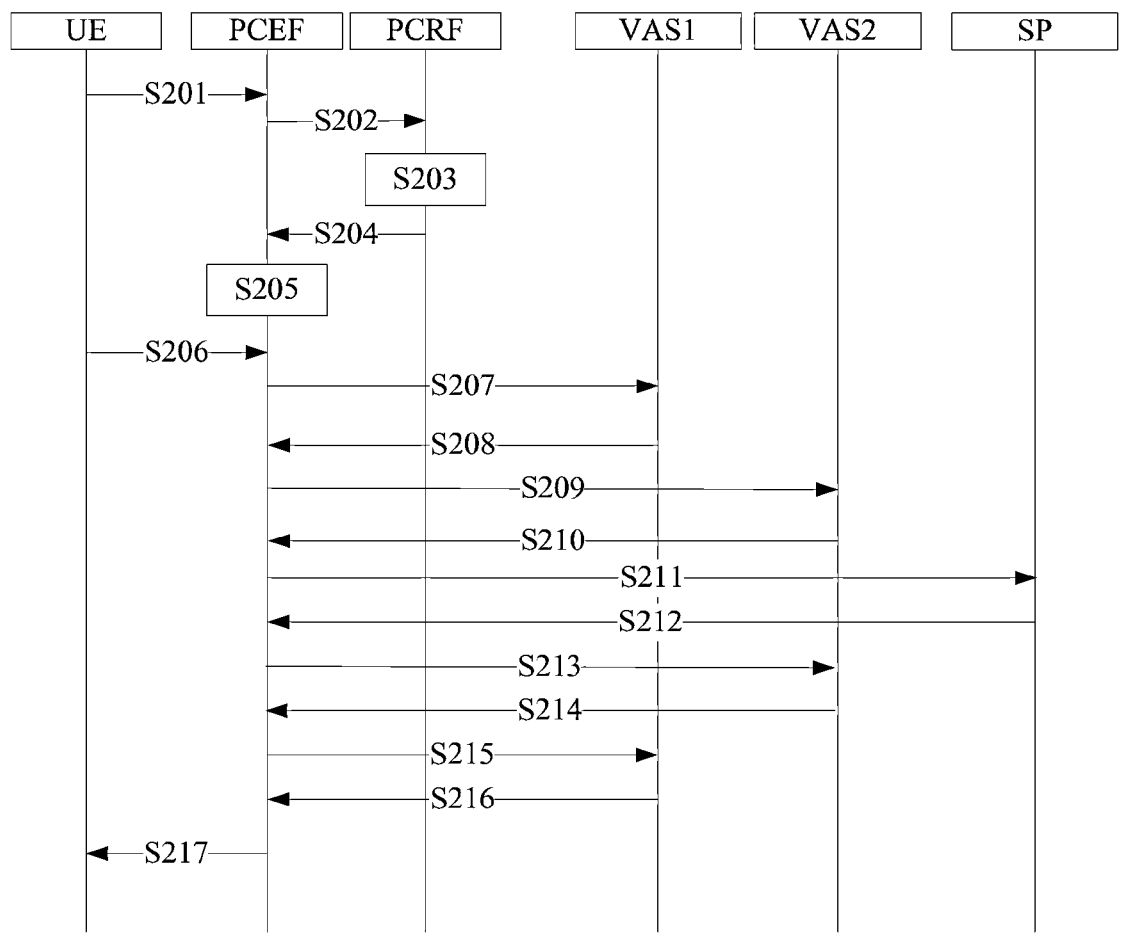
FIG. 2 is an interaction diagram of a method for controlling service transmission according to an embodiment of the present invention.

FIG. 2 shows an interaction diagram of a method for controlling service transmission according to an embodiment of the present invention. In the embodiment, a user subscribes to a package 1 released by an operator: CNY 10 for 100 MB traffic and free web page adaption service and video optimization service. The PCRF (policy decision server) may synchronize a subscription relationship of the user from the operator and save the subscription relationship. In addition, the PCRF may generate and maintain a subscription information list that records correspondence between the user information of the user and the subscription information (for example, recording a phone number of the user, an identifier VAS ID of a server (VAS 1) that implements the web adaption service, and an identifier VAS ID of a server (VAS 2) that implements the video optimization service). In addition, the PCRF may define a priority of the two servers, for example, as an example instead of a limitation, setting the priority to VAS 1>VAS 2, so that the PCEF forwards a service according to the priority (for example, forwarding the service first to the VAS 1 and then to the VAS 2).

As shown in FIG. 2, in S201, the UE gets online, and an NAS/AAA may send, for example, a Radius Accounting-Start request message to the PCEF, where the Radius Accounting-Start request message may carry user information (for example, a phone number and the like) of the UE or the user information and status information (for example, the current time, a bearer network, and the like).

In S202, the PCEF may send, for example, a Gx initial credit control request (CCR-I, Credit Control Request-Initial) message to the PCRF through, for example, a Gx interface, where the Gx CCR-I request message may carry service information of the UE. The service information may include user information or the user information and status information (for example, a phone number, the current time, a bearer network, and the like). It should be understood that the foregoing Gx CCR-I request message is only an example of the present invention, to which the present invention is not limited. Other messages, exchanged between the PCEF and the PCRF, which may carry user information of the UE, shall also fall within the protection scope of the present invention. In the following, the same or similar cases are not described.

In S203, after receiving the Gx CCR-I request message, the PCRF may query, according to service information reported by the PCEF, subscription information corresponding to the user information from a subscription information list that is created in advance, so as to determine a VAS forwarding rule (for example, VAS IDs, VLAN IDs, and IP addresses of VAS1 and VAS2) corresponding to a service of the UE.

The following is a specific example of a VAS forwarding rule in the implementation manner shown in FIG. 2:

VAS-Redirect-Install
VAS-Redirect-Rule-Name=ContentAdaptation
VAS-ID=VAS 1
Uplink-VLANID=1
Downlink-VLANID=2
Uplink-VASIP=10.10.10.1
Downlink-VASIP=10.10.10.1
Precedence=1
VAS-Redirect-Install
VAS-Redirect-Rule-Name=VideoOptimization
VAS-ID=VAS2
Uplink-VLANID=3
Downlink-VLANID=4
Uplink-VASIP=10.10.10.2
Downlink-VASIP=10.10.10.2
Precedence=2

The foregoing VAS forwarding rule may be encoded in binary format according to specifications. As shown in the foregoing content, in the foregoing forwarding rule, the priority of ContentAdaptation is higher than that of VideoOptimization.

In S204, the PCRF delivers the VAS forwarding rule to the PCEF by using a Gx credit control answer (CCA, Credit Control Answer) message. In addition, as described in the foregoing, the PCRF may deliver merely a VAS information indication identifier (for example, * VAS-Redirect-Rule-Name) used to indicate the VAS forwarding rule, and may also deliver all information of the VAS forwarding rule.

In S205, the PCEF determines and temporarily stores the VAS forwarding rule.

In S206, the UE initiates a Transfer Control Protocol (TCP, Transfer Control Protocol) connection and sends a data packet to the SP through a gateway device.

In S207, the PCEF forwards the data packet to the VAS1 according to the VAS forwarding rule.

In S208, the VAS1 performs value-added processing on the data packet and sends the processed data packet back to the PCEF.

In S209, the PCEF forwards the data packet to the VAS2 according to the VAS forwarding rule.

In S210, the VAS2 performs value-added processing on the data packet and sends the processed data packet back to the PCEF.

In S211, the PCEF sends the processed data packet to the SP.

In S212, the SP returns a response packet to the UE through the gateway device.

In S213, the PCEF forwards the response packet to the VAS2 according to the VAS forwarding rule.

In S214, the VAS2 performs value-added processing on the response packet and sends the processed response packet back to the PCEF.

In S215, the PCEF forwards the response packet to the VAS1 according to the VAS forwarding rule.

In S216, the VAS1 performs value-added processing on the response packet and sends the processed response packet back to the PCEF.

In S217, the PCEF sends the processed response packet to the UE.

Optionally, in the embodiment of the present invention, the obtaining status information that is used to indicate service status of the service includes:

obtaining first status information that is used to indicate initial service status of the service;

the determining the VAS information according to the user information and the status information includes:

determining, according to the user information and the first status information, first VAS information; and the method further includes:

determining that the initial service status changes;

obtaining second status information that is used to indicate the changed service status of the service; and the determining VAS information according to the user information further includes:

determining, according to the user information and the second status information, second VAS information.

Figure 3:
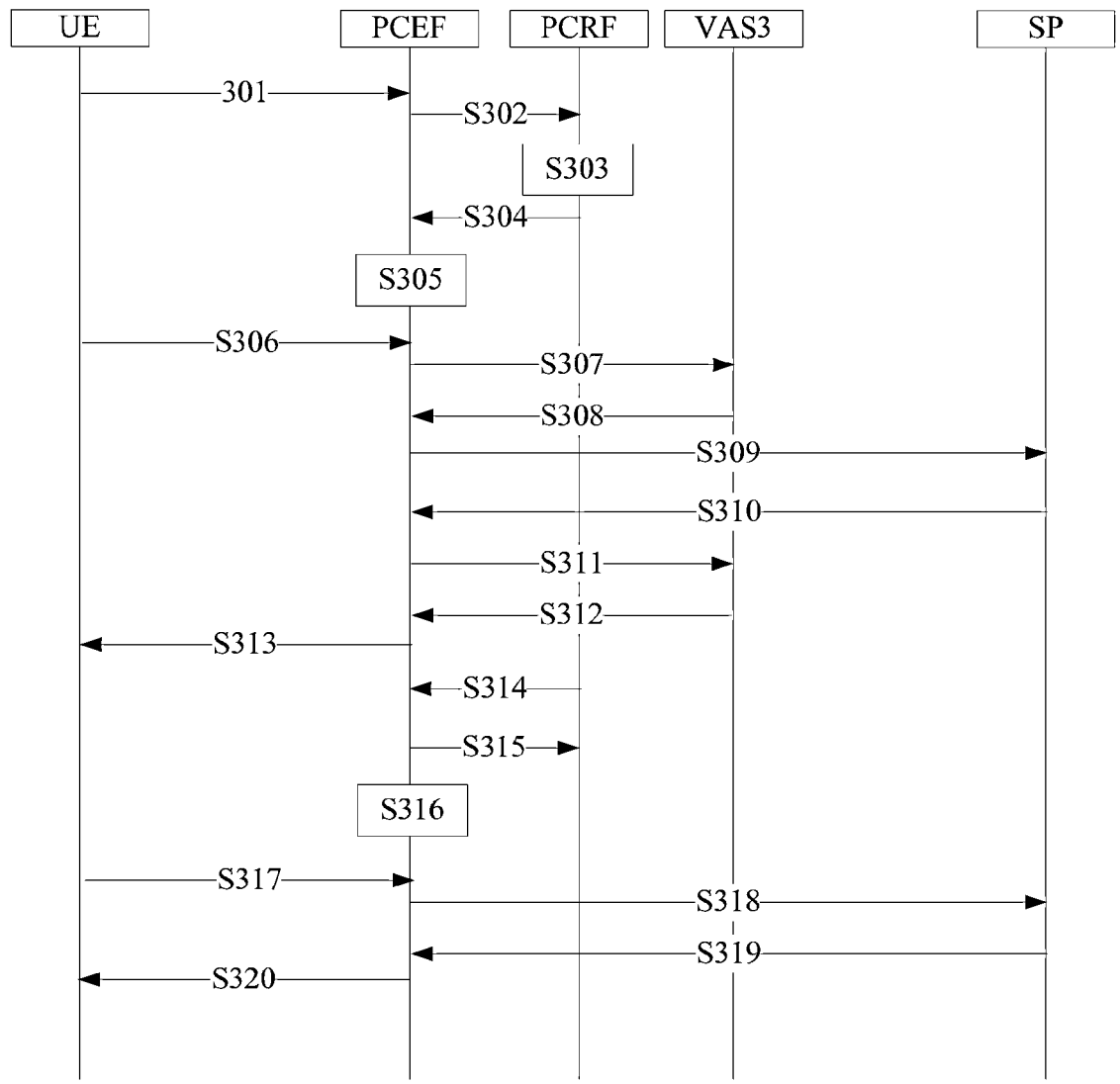
FIG. 3 is an interaction diagram of a method for controlling service transmission according to another embodiment of the present invention.

Specifically, FIG. 3 shows an interaction diagram of a method for controlling service transmission according to another embodiment of the present invention. In the embodiment, a user subscribes to a package 2 released by an operator: CNY 10 for 100M traffic and free online antivirus service, provided by the VAS 3 server, in a time period from 08:00 to 20:00. The PCRF (policy decision server) may synchronize a subscription relationship of the user from the operator and save the subscription relationship. In addition, the PCRF may generate and maintain a subscription information list that records correspondence between user information of the user and subscription information (for example, recording a phone number of the user and a VAS ID of a server (VAS 3) that implements the antivirus service).

As shown in FIG. 3, in S301, the UE gets online at 08:00, and an NAS/AAA may send, for example, a Radius Accounting-Start request message to the PCEF, where the Radius Accounting-Start request message may carry user information (for example, a phone number and the like) of the UE.

In S302, the PCEF may send, for example, a Gx CCR-I message to the PCRF through, for example, a Gx interface, where the Gx CCR-I request message may carry the user information.

In S303, after receiving the Gx CCR-I request message, the PCRF may query, according to service information reported by the PCEF, subscription information corresponding to the user information from a subscription information list that is created in advance, so as to determine a VAS forwarding rule, for example, a VAS ID, a VLAN ID, and an IP address of VAS3, corresponding to a service of the UE.

In S304, the PCRF delivers the VAS forwarding rule to the PCEF by using a Gx CCA message. In addition, as described in the foregoing, the PCRF may deliver merely a VAS information indication identifier (for example, * VAS-Redirect-Rule-Name) used to indicate the VAS forwarding rule, and may also deliver all information of the VAS forwarding rule.

In S305, the PCEF determines and temporarily stores the VAS forwarding rule.

In S306, the UE initiates a TCP link and sends a data packet to the SP through a gateway device.

In S307, the PCEF forwards the data packet to the VAS3 according to the VAS forwarding rule.

In S308, the VAS 3 performs value-added processing on the data packet and sends the processed data packet back to the PCEF.

In S309, the PCEF sends the processed data packet to the SP.

In S310, the SP returns a response packet to the UE through the gateway device.

In S311, the PCEF forwards the response packet to the VAS3 according to the VAS forwarding rule.

In S312, the VAS3 performs value-added processing on the response packet and sends the processed response packet back to the PCEF.

In S313, the PCEF sends the processed response packet to the UE.

In S314, the PCRF monitors that the current system time is 20:00 and delivers a policy (for example, the foregoing VAS-Redirect-Rule-Remove field) used to instruct the PCEF to cancel the current VAS forwarding rule and an updated VAS forwarding rule by using a Gx re-approval request (RAR, Re-Authorize Request) message.

In S315, the PCEF may return a Gx re-approval answer (RAR, Re-Authorize Answer) message to the PCRF.

In S316, the PCEF deletes the current VAS forwarding rule and saves the updated VAS forwarding rule.

In S317, the UE initiates a TCP link and sends a data packet to the SP through a gateway device.

In S318, the PCEF directly forwards the data packet to the SP according to the VAS forwarding rule.

In S319, the SP returns a response packet to the UE through the gateway device.

In S320, the gateway device forwards the response packet to the UE.

Specifically, a dynamic rule interface may be used between a PCRF and a PCEF in a PCC architecture. All forwarding rules of VAS information (VAS1 and VAS2) in different status are delivered to the PCEF by using, for example, a Gx message. It should be understood that, according to the situation, more VAS information may also be included, which is not specifically limited by the present invention. Here, for ease of description, describes an example that includes information of only two VASs. In this case, in a Gx message, other than the foregoing *[VAS-Redirect-Install], *[VAS-Redirect-Remove], *[VAS-Redirect-Rule-Name, and * [Precedence] fields, the *[Condition] field (indicating a use condition of the VAS, for example, it may be use time or use network) may also be added.

In addition, alternatively, a static rule interface may be used between the PCRF and the PCEF in the PCC architecture. That is, VAS information described in Table 3 may be configured in the PCEF in advance, so that the PCRF may send merely indication information corresponding to a specified forwarding rule (VAS information), for example, a VAS redirection rule name (* VAS-Redirect-Rule-Name) in Table 2, and deliver only the VAS-Redirect-Rule-Name field on the Gx interface, which means to activate or deactivate a certain VAS redirection rule. The PCEF queries a local statically-configured forwarding rule (stored in a memory database) and obtains VAS information about a VAS to which the service needs to be forwarded.

TABLE 3

| Field name | Field type | Field definition | Constraint |
| --- | --- | --- | --- |
| *VAS-Redirect-Rule-Name | Varchar2 (21) | Name of a VAS forwarding rule | NOT NULL |
| VAS ID | 32-bit unsigned integer (Unit32) | VAS ID | NOT NULL |
| Uplink-VLAN ID | Uint32 | Uplink VLAN ID of a VAS | NOT NULL |
| Downlink-VLAN ID | Uint32 | Downlink VLAN ID of a VAS | NOT NULL |
| Uplink-VAS IP | Uint32 | Uplink VAS IP of a VAS | NOT NULL |
| Downlink-VAS IP | Uint32 | Downlink VAS IP of a VAS | NOT NULL |
| Precedence | Uint32 | Priority | OPTIONAL |
| Condition | Uint32 | Use condition | OPTIONAL |

The foregoing describes an embodiment where the PCRF (policy decision server), in a case that the current service status changes (service time specified in subscription information is exceeded), delivers an updated VAS forwarding policy to replace the current VAS forwarding policy stored in the PCEF (gateway device). However, the present invention is not limited to the foregoing embodiment. The PCRF may also carry a piece of indication information in a Gx CCR-I message for the PCEF (gateway device) to determine that the current service status has changed, delete the current VAS forwarding policy stored, and send a Gx credit control update request (CCRU, Credit Control Request-Update) message to the PCRF to obtain an updated VAS forwarding policy. The PCRF delivers a VAS forwarding policy in the current status to the PCEF by using a Gx credit control update answer (CCRU, Credit Control Answer-Update) message.

The foregoing describes an embodiment where a gateway device, in a case that the current status changes, obtains a VAS forwarding rule again. However, the present invention is not limited to the foregoing embodiment. The gateway device may also obtain VAS forwarding rules in different service status at one time and select a corresponding VAS forwarding rule for use according to the service status.

Therefore, the PCEF may forward, in different service status, a data packet according to different VAS information (VAS forwarding rule).

In the method for controlling service transmission in the embodiment of the present invention, a VAS performs value-added processing on a data packet, and returns the data packet to a gateway device, allowing the gateway device to perform service arrangement flexibly according to dynamic information about a user.

For a TCP link, specifically, in the embodiment of the present invention, a gateway device may further provide a VAS status detection capability, that is, sending an Internet Control Message Protocol (ICMP, Internet Control Message Protocol) packet to each VAS at a certain interval (the interval may be set according to a requirement). If the gateway device does not receive an ICMP response for N consecutive times (the number of times may be set according to a requirement), it is determined that the VAS is ineffective. Furthermore, optionally, for an ineffective VAS, the gateway device may send an ICMP packet again after a certain interval (the interval may be set according to a requirement). If the gateway device receives an ICMP response for N consecutive times, it may be determined that the VAS is effective. Before forwarding a service to a VAS, the PCEF first queries the status of the VAS. If the VAS is ineffective, the VAS is skipped and a service flow is forwarded to a next VAS platform until the service flow does not need to be forwarded to a VAS. Then the PCEF forwards the service to a final SP.

In this way, when a service packet needs to be forwarded, it may be immediately learned whether a destination VAS of the service is effective, thereby shortening interaction time, increasing a service access speed, and reducing an impact on user experience.

Alternatively, in the embodiment of the present invention, the PCEF, before forwarding a service to a VAS, may first send an ICMP packet to the VAS. If an ICMP response is received within a specified time period (the time period may be set according to a requirement), it may be determined that the VAS is effective. Otherwise, it is determined that the VAS is ineffective. If the VAS is ineffective, the VAS is skipped and a service flow is forwarded to a next VAS platform until the service flow does not need to be forwarded to a VAS. Then the PCEF forwards the service to an SP.

In this way, the gateway device detects status of a corresponding VAS only when necessary, which can reduce an impact on performance of the gateway device.

In the method for controlling service transmission in the embodiment of the present invention, status of a VAS is detected. If the VAS is ineffective, no data packet is forwarded to the VAS, thereby ensuring normal access to a service of a user and avoiding failure of access to the service of the user due to unavailability of a certain VAS. In the following description, as an example instead of a limitation, a policy decision server is described by using a PCRF as an example, and a gateway device is described by using a PCEF as an example.

Figure 4:
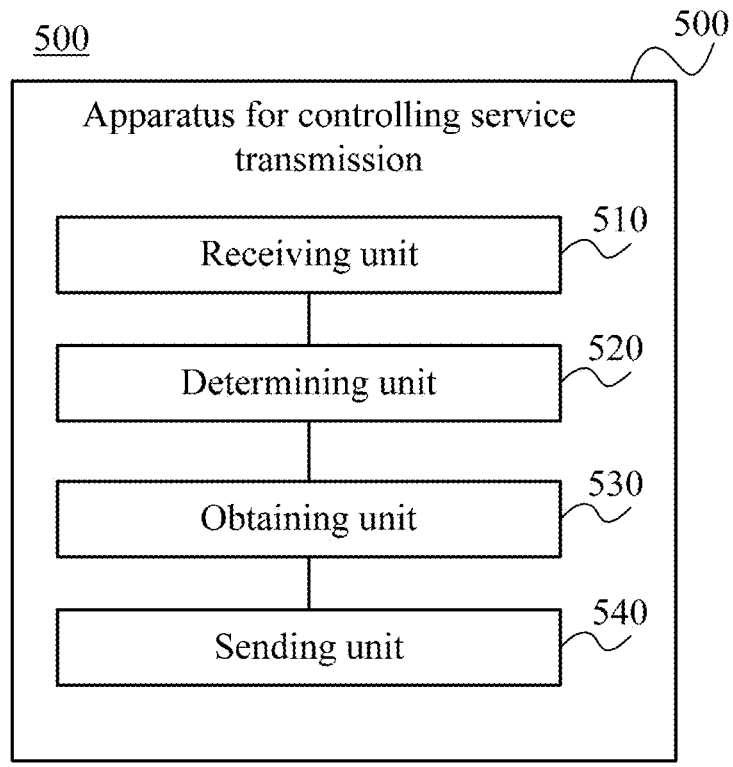
FIG. 4 is a schematic block diagram of an apparatus for controlling service transmission according to an embodiment of the present invention.

With reference to FIG. 1 to FIG. 3, the foregoing describes the method for controlling service transmission in details according to the embodiments of the present invention. With reference to FIG. 4, the following describes an apparatus for controlling service transmission in details according to an embodiment of the present invention.

FIG. 4 shows a schematic block diagram of an apparatus 500 for controlling service transmission according to an embodiment of the present invention. As shown in FIG. 5, the apparatus 500 includes:

a receiving unit 510, configured to receive a connection request message sent by a piece of user equipment that transmits a service, where the connection request message includes user information of the user equipment;

a determining unit 520, configured to determine value-added service system VAS information according to the user information, where the VAS information is used to indicate at least one destination VAS of the service;

the receiving unit 510, further configured to receive a first data packet of the service that is sent by a sending end;

an obtaining unit 530, configured to obtain a second data packet from the at least one destination VAS according to the VAS information, where the second data packet is a data packet obtained after the at least one destination VAS performs value-added processing on the first data packet; and a sending unit 540, configured to send the second data packet to a receiving end.

Optionally, in the embodiment of the present invention, the determining unit 520 is further configured to obtain status information that is used to indicate service status of the service; and to determine the VAS information according to the user information and the status information.

Optionally, in the embodiment of the present invention, the determining unit 520 is further configured to obtain first status information that is used to indicate initial service status of the service;

to determine that the initial service status changes;

to obtain second status information that is used to indicate the changed service status of the service; and to determine second VAS information according to the user information and the second status information.

In addition, the status information obtained by the determining unit 520 includes time information used to indicate the current time and/or bearer information used to indicate a current bearer network of the service.

According to the apparatus for controlling service transmission in the embodiment of the present invention, service arrangement can be performed flexibly for a value-added service of each VAS when a value-added service subscribed by a user changes with a trigger condition.

Optionally, in the embodiment of the prevent invention, the VAS information determined by the determining unit 520 is used to indicate at least two destination VASs of the service; and the obtaining unit 530 includes:

a sending module, configured to send the first data packet to a first destination VAS according to the VAS information;

a receiving module, configured to receive a third data packet sent by the first destination VAS, where the third data packet is a data packet obtained after the first destination VAS performs value-added processing on the first data packet;

the sending module is further configured to send the third data packet to a second destination VAS according to the VAS information; and the receiving module is further configured to receive a data packet sent by the second destination VAS, where the data packet is obtained after the second destination VAS performs value-added processing on the third data packet, and the data packet obtained after the second destination VAS performs value-added processing on the third data packet is a second data packet; or to send a data packet obtained after the second destination VAS performs value-added processing on the third data packet to at least another one destination VAS, so that the at least another one destination VAS performs value-added processing again on the data packet obtained after the second destination VAS performs value-added processing on the third data packet, and uses the data packet obtained after the at least one another destination VAS performs value-added processing again on the data packet, which is obtained after the second destination VAS performs value-added processing on the third data packet, as the second data packet.

In addition, in the embodiment of the present invention, the determining unit 520 is further configured to determine priority information that is used to indicate a sequence for sending a data packet in the at least two VASs; and the obtaining unit 530 is further configured to obtain, according to the VAS information and the priority information, a second data packet from the at least one destination VAS.

Optionally, in the embodiment of the present invention, the determining unit 520 is further configured to obtain, according to the user information, the VAS information from a first database generated based on correspondence between the user information and the VAS information.

Optionally, in the embodiment of the present invention, the determining unit 520 is further configured to obtain, according to the user information and the status information, the VAS information from a second database generated based on correspondence between the user information and status information and the VAS information.

Optionally, in the embodiment of the present invention, the sending unit 540 is further configured to send a first policy request message that includes the user information to a policy decision server;

the receiving unit 510 is further configured to receive a first policy request answer message that includes first control information and is sent by the policy decision server, where the first control information is determined by the policy decision server according to the user information and is used to indicate the VAS information; and the determining unit 520 is further configured to determine the VAS information according to the first control information.

Optionally, in the embodiment of the prevent invention, the determining unit 520 is specifically configured to determine the VAS information according to a VAS information indication identifier included in the first control information; or to obtain the VAS information from the first control information.

Optionally, in the embodiment of the present invention, the determining unit 520 is further configured to obtain, according to the user information, the VAS information from a first database generated based on correspondence between the user information and the VAS information.

Optionally, in the embodiment of the present invention, the sending unit 540 is further configured to send a second policy request message that includes the user information and the status information to a policy decision server;

the receiving unit 510 is further configured to receive a second policy request answer message that includes second control information and is sent by the policy decision server, where the second control information is determined by the policy decision server according to the user information and the status information and is used to indicate the VAS information; and the determining unit 520 is configured to determine the VAS information according to the second control information.

Optionally, in the embodiment of the prevent invention, the determining unit 520 is specifically configured to determine the VAS information according to a VAS information indication identifier included in the second control information; or to obtain the VAS information from the second control information.

In this way, specific VAS information is configured on the gateway device, so that the policy decision server can complete indication of a forwarding rule, namely, VAS information, by merely delivering indication information, thereby shortening interaction time, increasing a service access speed, and reducing an impact on user experience.

Optionally, in the embodiment of the present invention, the determining unit 520 is further configured to obtain the VAS information from the control information.

In this way, all VAS information is configured outside a gateway device, thereby minimizing an impact on performance of a network device.

In the apparatus for controlling service transmission in the embodiment of the present invention, a policy decision server deployed outside a gateway device determines control information of the service, and the gateway device controls service transmission according to the control information, thereby reducing an impact of service forwarding according to dynamic information about a user on performance of the gateway device, maintaining continuous update for a piece of user equipment, and reducing network maintenance workload.

Optionally, in the embodiment of the present invention, the sending unit 540 is further configured to send a test message to the at least one destination VAS;

the receiving unit 510 is further configured to receive a test response message sent by the at least one destination VAS; and the determining unit 520 is further configured to determine, according to the test response message, that the at least one destination VAS is effective.

In the apparatus for controlling service transmission in the embodiment of the present invention, status of a VAS is detected. If the VAS is ineffective, no data packet is forwarded to the VAS, thereby ensuring normal access to a service of a user and avoiding failure of access to the service of the user due to unavailability of a certain VAS.

In the embodiment of the present invention, the VAS information includes a VAS identifier ID, a virtual local area network VLAN ID of the VAS, and an Internet Protocol IP address of the VAS.

In the embodiment of the present invention, the user information includes at least one of a mobile subscriber phone number MSISDN, an international mobile subscriber identifier IMSI, an international mobile equipment identity IMEI, and a server Internet Protocol IP address.

The apparatus 500 for controlling service transmission according to the embodiment of the present invention may correspond to a gateway device (for example, a PCEF) in a method in the embodiment of the present invention. In addition, all units, namely, modules and the foregoing other operations and/or functions in the apparatus 500 for establishing a communication connection are used to implement a corresponding process of the method 100 in FIG. 1. For brevity, details are not repeatedly described herein.

Figure 5A:
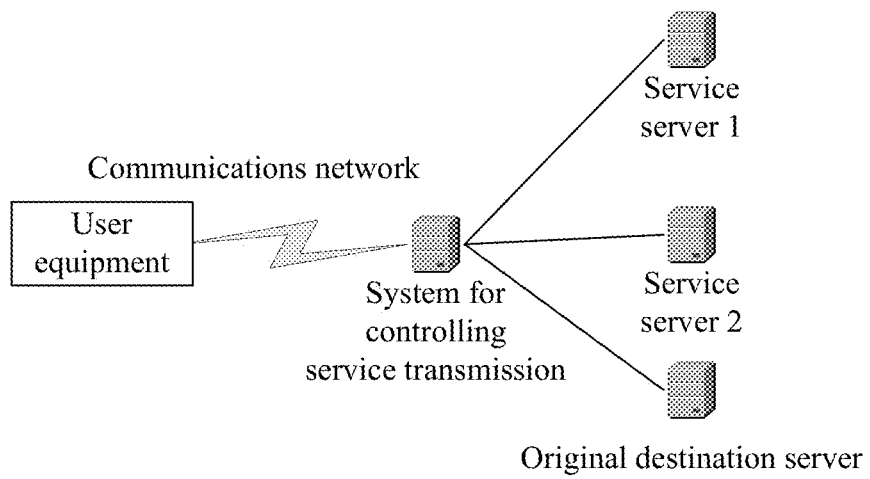
FIG. 5a is a schematic architecture diagram of a system according to an implementation manner of the present invention.

In the apparatus for controlling service transmission in the embodiment of the present invention, a VAS performs value-added processing on a data packet, and returns the data packet to a gateway device, allowing the gateway device to perform service arrangement flexibly according to dynamic information about a user. FIG. 5a is a schematic architecture diagram of another system according to an implementation manner of the present invention. With reference to FIG. 5a, a system for controlling service transmission in the communications system may be a system consisting of the foregoing policy decision server and gateway device. Specifically, it may be a system consisting of multiple computers and may also be a single device, or be distributed on different network nodes, which is not limited by the present invention. The user equipment, as described in the foregoing, may be any type of mobile or non-mobile user equipment. A service server may be any server that provides a specific service, for example, an online antivirus server, a video optimization server, an HTTP cache acceleration server, or the like, which is not limited by the implementation manners A piece of user equipment in the system connects to and communicates with one or more service servers through the system for controlling service transmission, and the involved communication connection technologies are not repeatedly described herein.

Figure 5B:
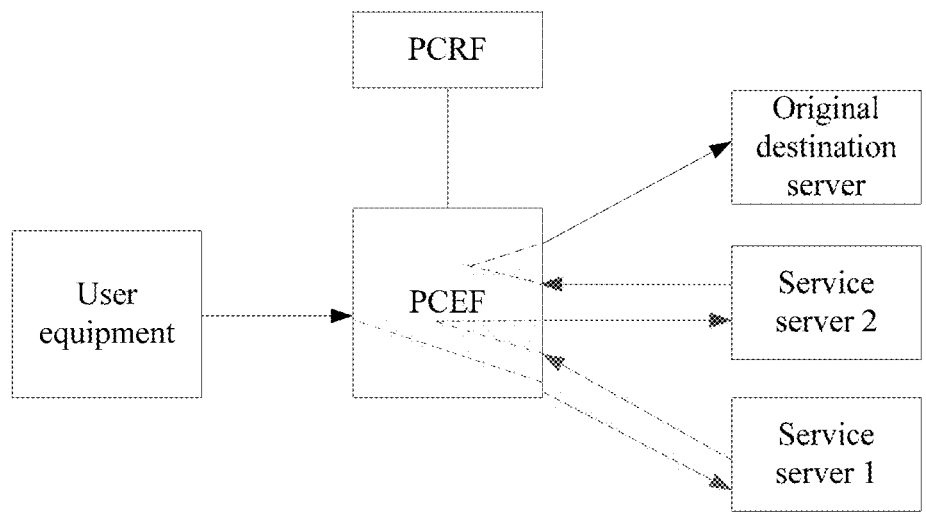
FIG. 5b is a schematic architecture diagram of another system according to an implementation manner of the present invention, including a schematic trend of an uplink service flow.
Figure 5C:
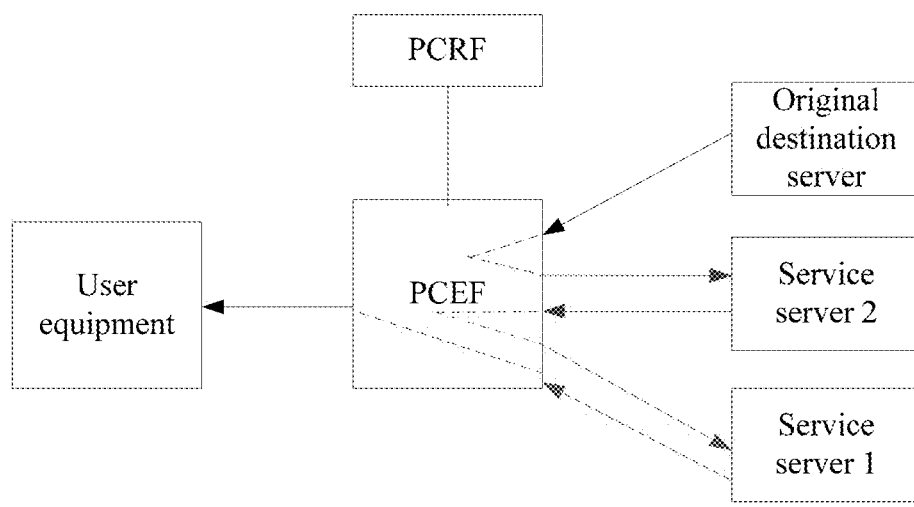
FIG. 5c is a schematic architecture diagram of still another system according to an implementation manner of the present invention, including a schematic trend of a downlink service flow.

Alternatively, FIG. 5b and FIG. 5c show schematic architecture diagrams of another system according to an implementation manner of the present invention. The system for controlling service transmission in the system uses a policy and charging control (PCC, Policy and Charging Control) architecture. In FIG. 5b, directed arrows from the user equipment to the PCEF, the first service server, the second service server, and the original destination server in sequence indicate a trend of an uplink service flow. In FIG. 5c, directed arrows from the original destination server to the second service server, the first service server, the PCEF, and the user equipment in sequence indicate a trend of a downlink service flow.

Systems shown in FIG. 5a, FIG. 5b, and FIG. 5c may implement the methods for controlling service transmission in the following. Operating principles of the systems are described as in the methods.

Figure 6:
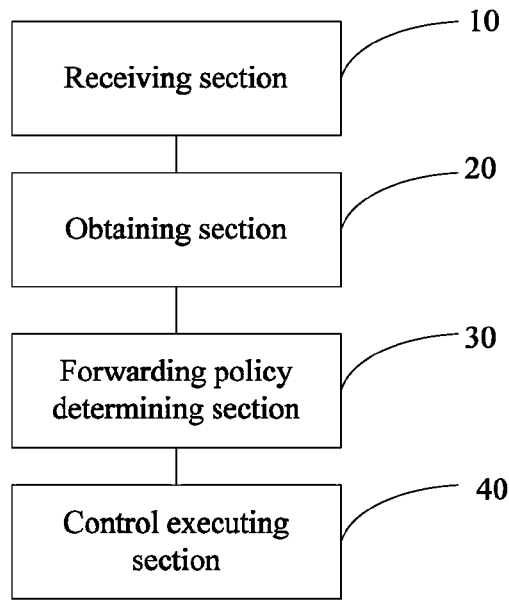
FIG. 6 is a simplified schematic flowchart of a method for controlling service transmission according to an implementation manner of the present invention.

As shown in FIG. 6, it is a simplified schematic flowchart of a method for controlling service transmission according to an implementation manner. The method includes the following sections:

10: receiving, by a system for controlling service transmission, communication data sent by a piece of user equipment, where the communication data carries information about an original destination server (which is referred to as a receiving section Receiving Section);

Specifically, the communication data sent by the user equipment is a collective name of all signaling sent by the user equipment, for example, a data service activation request or a data service change request at a communication link establishing stage, or a service request at an actual service communication stage.

20: obtaining, according to the communication data, any one or any combination of dynamic information about a user of the user equipment and service layer information of the communication data; (which is referred to as an obtaining section Obtaining Section);

Specifically, the dynamic information about the user refers to a phone number of the user of the user equipment, an IMSI of the user, an IP address of the user, service subscription information of the user, a bearer type of a current network, or the like. The service layer information refers to service-related L7 layer or L7+ layer information (also known as an application layer). Certainly, in the "obtaining section", any combination of the foregoing information may be obtained, for example, combination of various dynamic information about a user, combination of various service layer information, or combination of various dynamic information about a user and service layer information.

It should be noted that a process of obtaining dynamic information about a user and a process of obtaining service layer information may be carried out at different stages of a communication process, and are respectively described in the implementation manners of FIG. 7a and FIG. 7b in the following.

30: determining a forwarding policy according to any one or any combination of the obtained dynamic information about the user and the obtained service layer information, where the forwarding policy includes: forwarding service data sent by the user equipment to at least one service server, and the at least one service server is different from the original destination server carried in the communication data (which is referred to as a forwarding policy determining section Determining Policy of Transfer Section); and For ease of understanding, service data sent by the user equipment is a collective name of various signaling sent by the user equipment at the actual service communication stage. Specifically, if the communication data sent by the user equipment in the receiving section 10 is sent at the communication link establishing stage, the service data here is service data (that is, service data sent by the user equipment after the communication data is sent, for example, a service request, and the like) sent by the user equipment after a communication link is established. If the communication data sent by the user equipment in the receiving section 10 is sent at the service communication stage, the service data here is the same as the communication data in the receiving section 10 and the obtaining section 20.

40: control to implementing (control to implement) the following procedure: sending the service data sent by the user equipment to the at least one service server, receiving the service data processed by the at least one service server, and sending the received service data that is has been processed to the original destination server carried in the communication data (which is referred to as a control executing section Control to Implement Section).

By using the implementation manner shown in FIG. 6, the system for controlling service transmission may perform control and processing flexibly for a service according to the dynamic information about the user or the service layer information, and in particular, forward a service to a service server other than the original destination service server, enriching communications services while avoiding repeated transmission of oversize communication data. In particular, the user equipment does not need to send related service data to different service servers at multiple times, saving communications resources to some extent and improving communication efficiency.

Figure 7A:
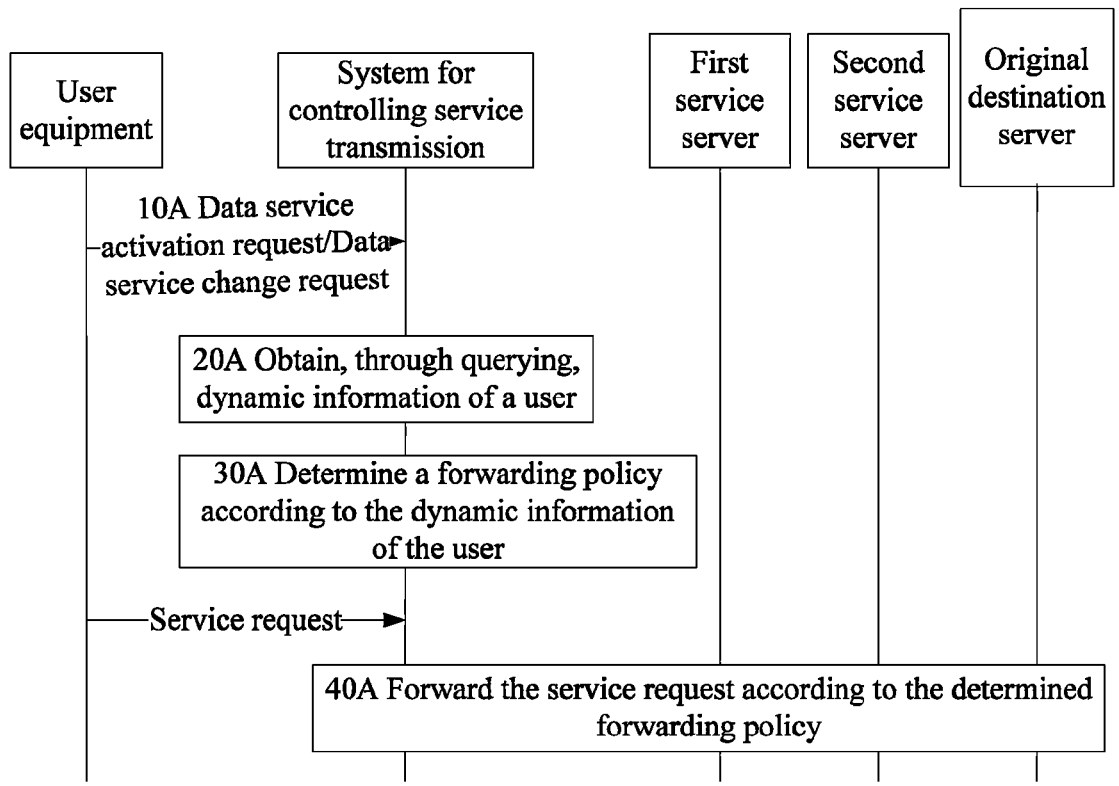
FIG. 7a is a schematic flowchart of a method for controlling service transmission according to an implementation manner of the present invention.
Figure 7B:
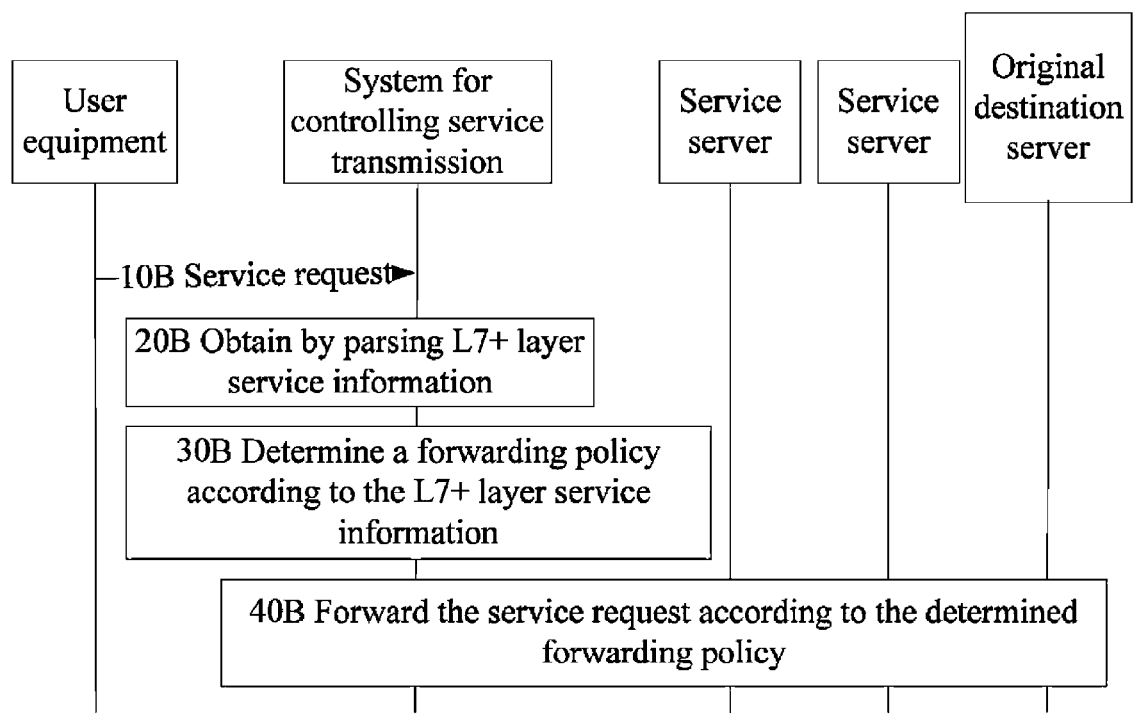
FIG. 7b is a schematic flowchart of another method for controlling service transmission according to an implementation manner of the present invention.

Specifically, in the implementation manner shown in FIG. 6, each section may change according to different service scenarios, at least including more specific solutions as shown in FIG. 7a and FIG. 7b. With reference to FIG. 7a, an implementation manner of a method for controlling service transmission includes:

10A: receiving section:

receiving, by a system for controlling service transmission, a data service activation request or a data service change request sent by a piece of user equipment, where the request carries information about an original destination server.

20A: obtaining section:

parsing the data service activation request or the data service change request to obtain dynamic information about a user, or obtaining, through querying, dynamic information about a user according to a result of the parsing. Dynamic information about a user includes but is not limited to a phone number of the user, an IMSI of the user, an IP address of the user, service subscription information of the user, a bearer type of a current network, or the like. In a specific example, according to the architecture of each existing communications network, information (for example, an IMSI or IP address of a user) that identifies a user identity may be obtained first by parsing, and then a server or database that stores user-related information on a communications network may be queried to obtain corresponding service subscription information, and the like.

30A: forwarding policy determining section:

determining a forwarding policy according to the obtained dynamic information about the user, where the forwarding policy includes: forwarding service data sent by the user equipment to at least one service server, and the at least one service server is different from the original destination server carried in the communication data.

For example, the forwarding policy may include: sending a service request of a piece of user equipment to a certain service server, where a phone number of the user equipment is within a certain phone number segment.

40A: control executing section: receiving a service request sent by the user equipment, sending the service request to the at least one service server, receiving the service data processed by the at least one service server, and sending the received service data that has been processed to the original destination server carried in the communication data (which is referred to as a control executing section). The service request sent by the user equipment is sent after the foregoing communication data (a data service activation request or a data service change request) is sent by the user equipment.

Alternatively, FIG. 7b provides an implementation manner of another method for controlling service transmission, including:

10B: receiving section:

receiving, by a system for controlling service transmission, a service request sent by a piece of user equipment, where the request carries information about an original destination server.

20B: obtaining section:

performing, according to the service request of the user, in-depth data analysis to obtain the service layer information of the service request. Specifically, in-depth data analysis may apply any possible technical solution in the prior art to parse the service request and obtain service layer information, in particular, layer 7 or layer 7+ information (L7+ layer), specifically, information at application layer 7 such as a protocol (P2P/Email/HTTP, and on the like), and layer 7+ information such as an HTTP domain name website under the HTTP protocol.

30B: forwarding policy determining section:

determining a forwarding policy according to the obtained service layer information, where the forwarding policy includes: forwarding service data sent by the user equipment to at least one service server, and the at least one service server is different from the original destination server carried in the communication data.

Specifically, for example, determine, according to the obtained information that the service request is an Email protocol, the following forwarding policy: a service request being the Email protocol needs to be forwarded to an antivirus service server and then to the original destination server (Email server).

40B: control executing section:

sending, by the system for controlling service transmission, according to the control policy in 30B, the service request to at least one service server, receiving the service data processed by the at least one service server, and sending the received service data that has been processed to the original destination server carried in the communication data.

Specifically, as described in the foregoing example, first send the Email service request to the antivirus service server, receive service data that is obtained through antivirus processing by the antivirus service server, and then send the service data obtained through antivirus processing to the Email server.

A person of ordinary skill in the art may know that the solutions in FIG. 7a and FIG. 7b may be broken down and combined in a case free from a logical contradiction. For example, steps 10A, 20A, 10B, and 20B are carried out first, and then the "forwarding policy determining section" is carried out. That is, a corresponding forwarding policy may be determined based on any combination of dynamic information about a user and service layer information. For example, a forwarding policy may be obtained based on user subscription information and service layer information. Specifically, for example, if a user subscribes to an "email antivirus service" and a service request sent by the user is an Email service request, a forwarding policy is determined: forwarding a service request to an antivirus service server and then to the original destination server (Email server).

A person skilled in the art may know that, compared with a solution that performs service steering by using a static policy, with the foregoing more flexible policy settings, a solution that uses a forwarding policy for multiple combinations of user dynamic information and service layer information does not need to steer all communication data (traffic) at a fixed IP/Port as under a static policy, thereby reducing a performance requirement of a back-end system, saving communications resources, and easing occupation of a communications system.

Figure 8:
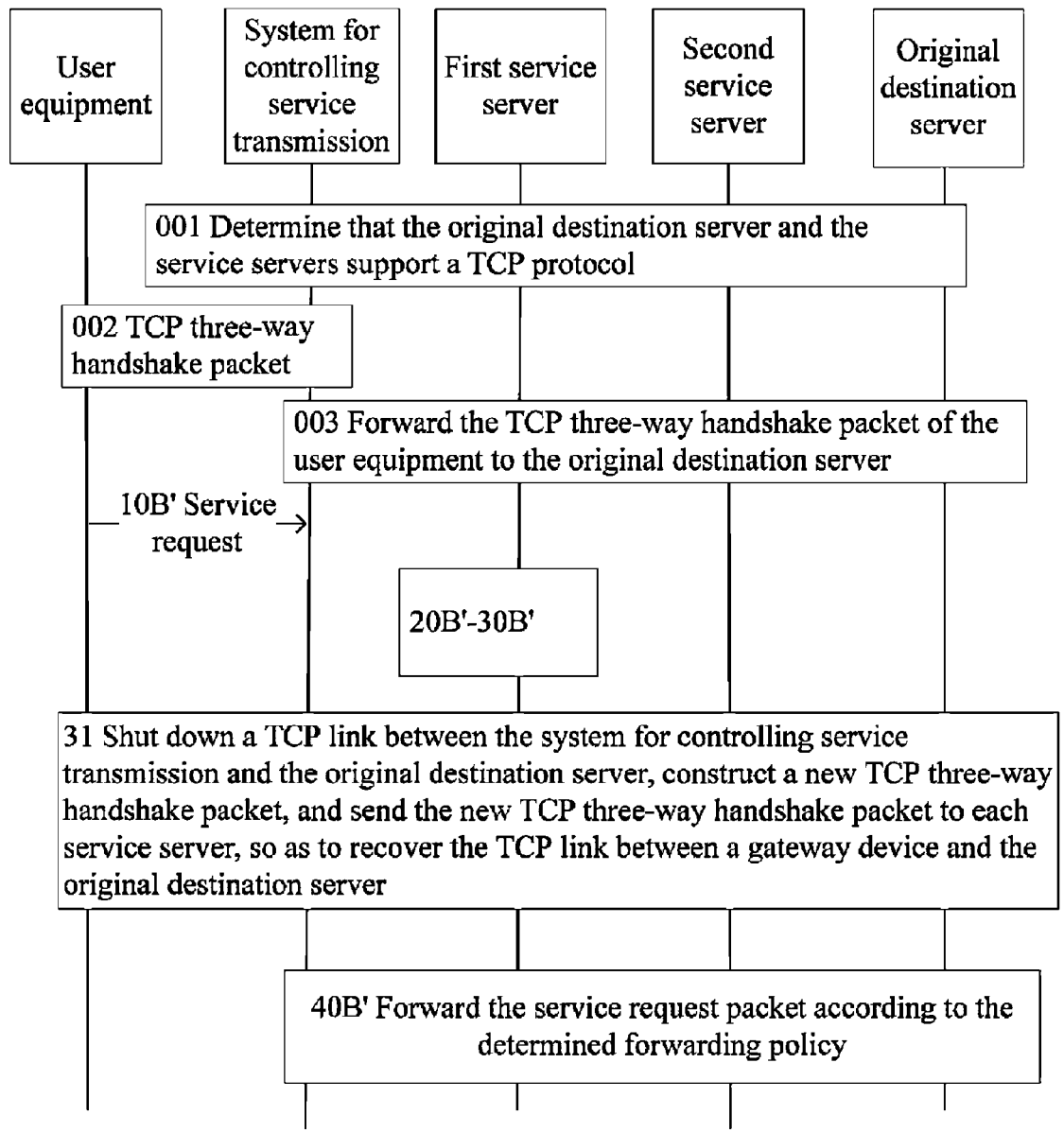
FIG. 8 is a schematic flowchart of a method for controlling service transmission according to an implementation manner of the present invention.

The foregoing implementation manners may use different communications protocols, such as the TCP/IP protocol or UDP protocol. In a system that uses the TCP/IP protocol, an implementation manner of the method for controlling service transmission shown in FIG. 8 is provided, so that a service server other than each origination destination server can sense link status of a user request, thereby reducing a packet processing requirement for the service server. The implementation manner may be based on the foregoing implementation manners, where a difference thereof lies in that a TCP three-way handshake packet may be further constructed for each service server after a service request is preliminarily parsed (for example, identifying a service protocol or an HTTP protocol). The implementation manner may further enable a system to apply to a service server with various basic capabilities, reducing a difficulty in integrating a system for controlling service transmission with a service server.

In the method shown in FIG. 8, that a first service server and a second service server are service servers is used as an example, and the method includes:

001: A system for controlling service transmission (for example, a TCP protocol processing module 500 of the system) determines that an original destination server and at least one service server support the TCP protocol. Specifically, the system for controlling service transmission may determine, according to a protocol field in communication data sent by a piece of user equipment, whether the TCP/IP protocol is used.

002-003: The system for controlling system transmission (in particular, for example, the TCP protocol processing module 500 of the system) receives a TCP three-way handshake packet sent by the user equipment and forwards the TCP three-way handshake packet sent by the user equipment to the original destination server.

For clear and easy understanding of a three-way handshake signaling process in the implementation manner, the following describes basic principles of a TCP/IP protocol three-way handshake. The TCP/IP protocol is generally used to send mass data. TCP is also used when an application program needs to make an acknowledgment after receiving data. To provide reliable transmission, the TCP/IP protocol numbers a data packet in a specific order sequence before sending new data and requires an acknowledgment message after the data packet is sent to the target machine. The so-called "three-way handshake" (three times handshake; three-way handshaking) is to negotiate how to track data volume sent each time to synchronize sending and receiving of a data segment, how many data acknowledgments to be determined according to the received data volume, and when to withdraw an association after data sending and receiving is completed, and establish a virtual link.

In the TCP/IP protocol, the TCP/IP protocol provides a reliable connection service and establishes a link by using a three-way handshake. That the two communication parties are a piece of user equipment and a server is used as an example, main content of the three-way handshake includes: a first handshake: when a connection is being established, the user equipment sends an syn packet (syn j) to the server, enters the SYN SEND state, and waits for an acknowledgment from the server; SYN: synchronize sequence number (Synchronize Sequence Numbers); a second handshake: the server receives the syn packet, confirms an ACK (ack=j+1) of a customer, at the same time, sends an SYN packet (syn=k), namely, an SYN+ACK packet, and enters the SYN RECV state; and a third handshake: the user equipment receives the SYN+ACK packet sent by the server and sends an acknowledgment packet ACK (ack=k+1) to the server; after the packet is sent, the user equipment and the server enter the ESTABLISHED state, thereby completing the three-way handshake. After the three-way handshake is completed, the user equipment and the server may start transmitting data. After the foregoing processing of the TCP three-way handshake packet in the 002C-003C, the system for controlling service transmission establishes a TCP link between the user equipment and the original destination server. The system for controlling service transmission may allocate a user equipment side socket Socket1 and an original destination server side socket Socket2. A socket, which means a socket originally, is generally referred to as a "socket" in a concept of a Unix communication mechanism, is used to describe an IP address and a port, and serves as a handle of a communication link.

10B': The system for controlling service transmission (in particular, for example, an obtaining module (M200)) receives service data sent by the user equipment through the TCP link between the user equipment and the original destination server, where the service data carries information about the original destination server.

Execute 20B'-30B', of which the specific procedure is similar to 10B-30B shown in FIG. 7b. Specifically, 20B' obtaining section: performing, according to a service request of a user, in-depth data analysis to obtain the service layer information of the service request; and 30B' forwarding policy determining section: determining a forwarding policy according to the obtained service layer information, where the forwarding policy includes: forwarding service data sent by the user equipment to at least one service server, and the at least one service server is different from the original destination server carried in the communication data. For specific examples, reference may be made to the description of 10B-30B in the foregoing, and details are not repeatedly described herein.

31: After the 30B' forwarding policy determining section, the system for controlling service transmission (in particular, for example, a TCP link reconstructing module 600 of the system) shuts down the TCP link between the system for controlling service transmission and the original destination server, constructs a new TCP three-way handshake packet, sends the new TCP three-way handshake packet to each service server, and then recovers the TCP link between a gateway device and the original destination server, specifically, including:

shutting down, by the system for controlling service transmission, the TCP link between the system for controlling service transmission and the original destination server, where various technical solutions may be used in the process for shutting down the TCP link, for example, sending RST signaling;

constructing a new TCP three-way handshake packet according to the TCP three-way handshake packet between the user equipment and the original destination server, where the new TCP three-way handshake packet includes sender information and original destination server information in the TCP three-way handshake packet, and information about the at least one service server to which the new TCP three-way handshake packet needs to be forwarded, and, specifically, the information about the at least one service server includes: a VLAN identifier of the at least one service server, a tunnel identifier of the at least one service server, or a physical port identifier of the at least one service server; and sending the new TCP three-way handshake packet to the original destination server through the at least one service server, so as to recover the TCP link between the system for controlling service transmission and the original destination server. Based on the foregoing processing, each service server can sense link status of a user request, or a reliable TCP link is established between each service server and the user equipment or the original destination server.

40B': Based on the foregoing newly established TCP link that can be sensed by each service server, the system for controlling service transmission (specifically, for example, a control executing module (M400)) completes the control executing section, and executing details are not repeatedly described herein.

A person skilled in the art may know that, for an original destination server or a service server that uses the UDP protocol, the system for controlling service transmission may exclude the foregoing handshake packet forwarding process.

Based on the foregoing methods for controlling service transmission (for example, methods shown in FIG. 1, FIG. 2, FIG. 3, FIG. 6, FIG. 7a, FIG. 7b, and FIG. 8), a person skilled in the art may know that the forwarding policy in the previously described implementation manners may include: information about multiple service servers that need to receive service data sent by the user equipment and a sequence of the multiple service servers. Correspondingly, the control executing section includes: sending service data sent by the user equipment to a service server ranked top among the service servers, receiving the service data processed by the service server ranked top among the service servers, sending the received service data that has been processed to a next service server ranked behind among the service servers, receiving the service data processed by the next service server until the service data processed by the multiple service servers is received, and sending the received service data processed by the multiple service servers to the original destination server carried in the service data.

In a specific application process, multiple methods may be used to indicate the sequence of the multiple service servers in the forwarding policy, where a simple manner saving communications resources includes: identifiers of multiple VLANs that an uplink flow needs to pass in sequence, identifiers of multiple tunnels that an uplink flow needs to pass in sequence, or identifiers of multiple physical ports that an uplink flow needs to pass in sequence.

In the foregoing solution that indicates the sequence of the multiple service servers in the forwarding policy, in the control executing section, a sequence for sending service data is controlled according to the multiple VLAN identifiers, multiple tunnel identifiers, or multiple physical port identifiers, where a sequence for sending an uplink flow is the same as that specified in the forwarding policy, and a sequence for sending a downlink flow is opposite to that specified in the forwarding policy. In this implementation manner, on one hand, simple information that may uniquely identify a service server location is used, and, on the other hand, no resource is wasted specifying a sending sequence for a downlink flow, significantly reducing occupation of communications resources in the implementation manner from an overall perspective.

Certainly, alternatively, the foregoing forwarding policy in the previously mentioned implementation manners may include information about multiple service servers that need to receive service data sent by the user equipment, but excludes a sequence of the multiple service servers. In this case, the control executing section includes: sending service data sent by the user equipment to the multiple service servers in parallel, and receiving multiple pieces of service data processed by the multiple service servers; and performing comprehensive processing on the received service data processed by the multiple service servers, generating new service data, and sending the new service data to the original destination server carried in the service data. Specifically, the comprehensive processing refers to combining or discarding duplicate service data and generating new service data.

For the foregoing implementation manners, the control executing section may further include:

determining that operating status of any one of the service servers is effective. In this implementation manner, the control executing section may further include:

sending service data corresponding to the communication data only to a service server of which the operating status is confirmed as effective, and receiving the service data processed by the service server; and sending the received service data that has been processed to the original destination server carried in the service data.

Figure 9A:
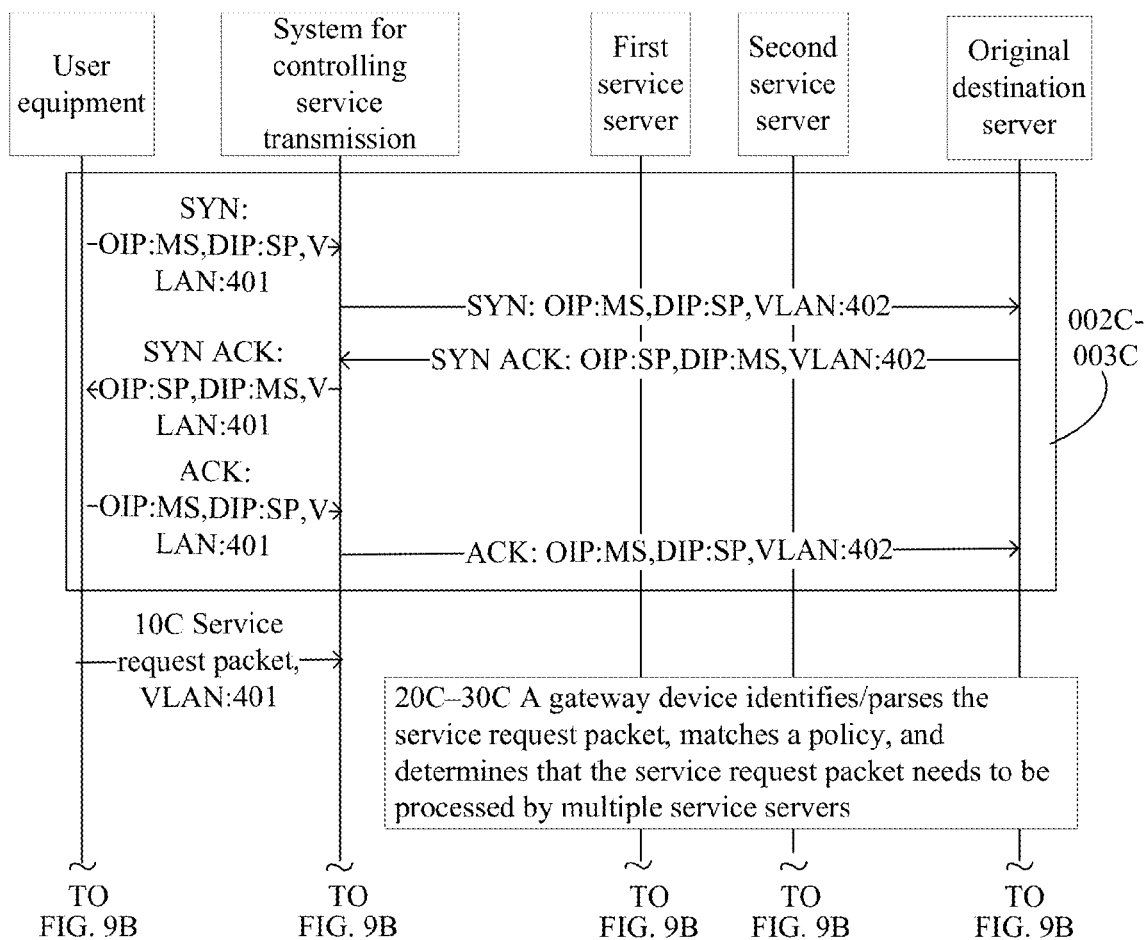
FIG. 9A, 9B, 9C are a schematic signaling diagram of an example of the method shown in FIG. 8.
Figure 9B:
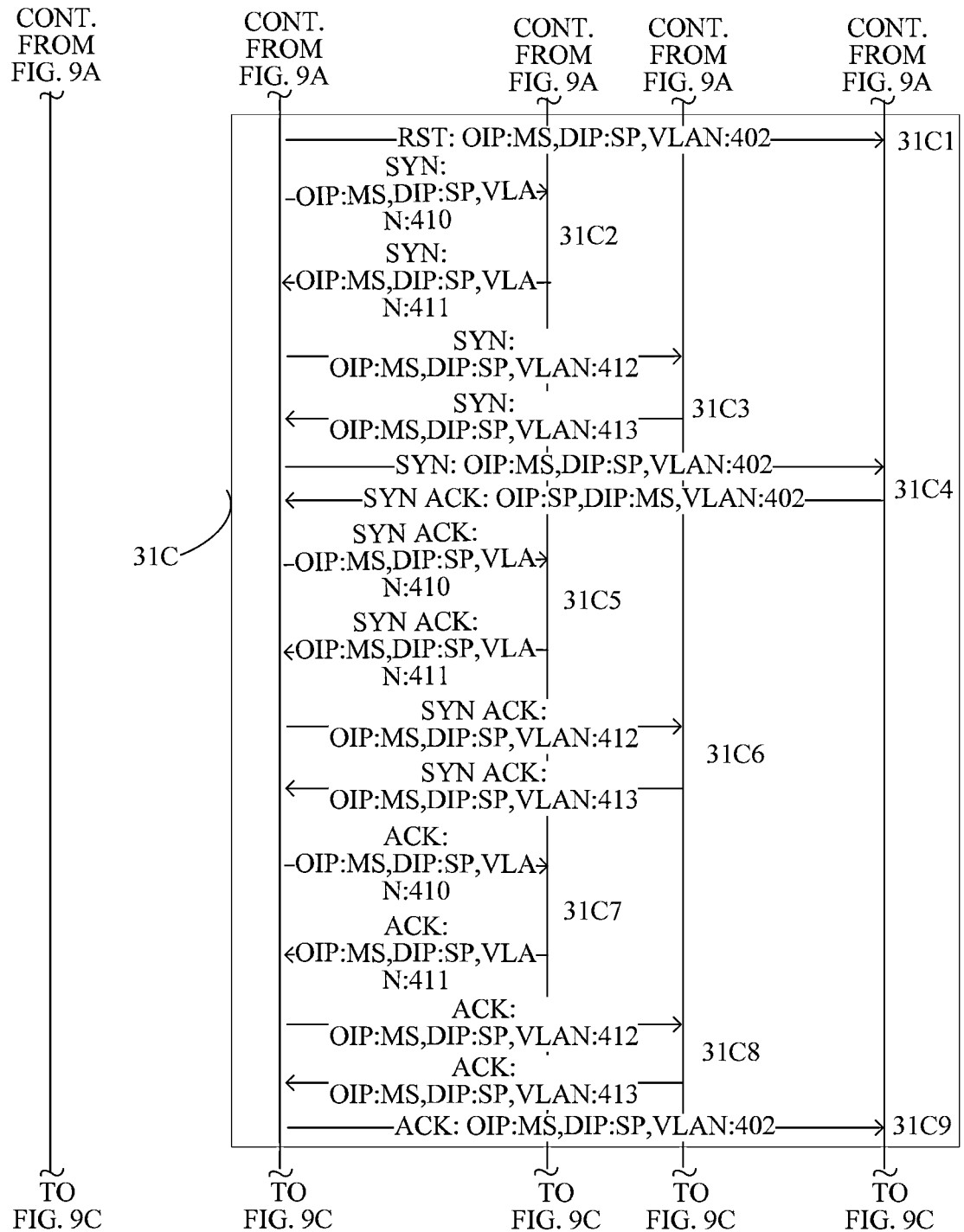
Figure 9C:
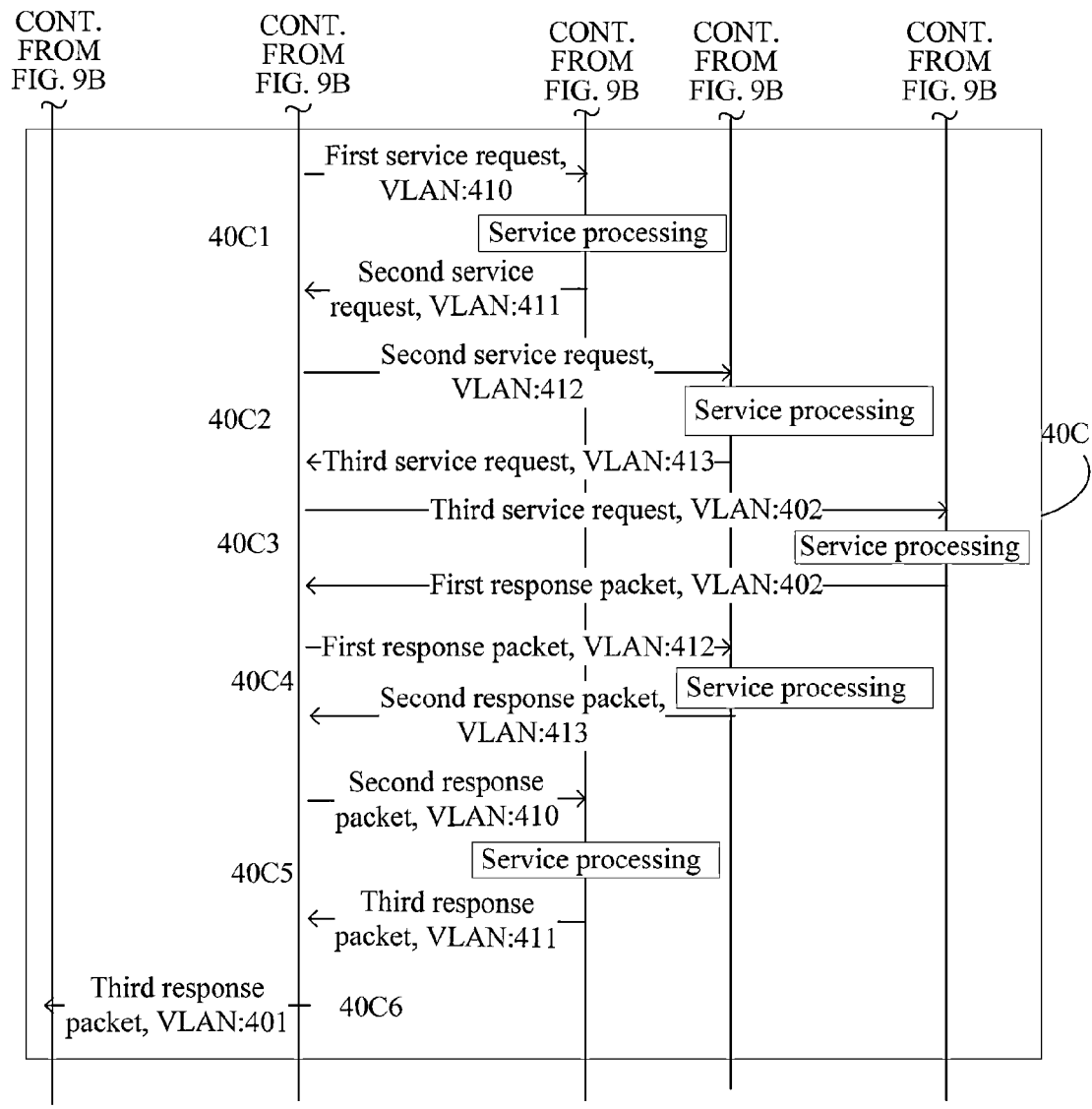

For easy understanding of the foregoing implementation manner, a case that a service flow needs to be forwarded to two service servers under the TCP/IP protocol is used as an example in the following, and a schematic signaling flow-chart diagram shown in FIG. 9 is provided. In the implementation manner, a VLAN identifier is used to identify each node that includes each service server. The method shown in FIG. 9A, 9B, 9C includes:

001C (not shown in the figure): Determine that an original destination server, a first service server, a second service server, and the like support a TCP/IP protocol. Specifically, the system for controlling service transmission may determine whether the TCP/IP protocol is used according to a protocol field in communication data sent by a piece of user equipment.

002C: The system for controlling service transmission receives a TCP three-way handshake packet of the user equipment, where, in the three-way handshake packet, a source address is a user equipment address, and a destination address is an original destination server address, for example, the "OIP:MS,DIP:SP" field in the signaling shown in FIG. 9. In addition, the three-way handshake packet carries an identifier of an uplink virtual local area network VLAN that comprises a piece of user equipment and a gateway device system for controlling service transmission, for example, the "VLAN:401" field. For ease of description, the TCP three-way handshake packet sent by the foregoing user equipment is referred to as a first TCP three-way handshake packet for short.

003C: The system for controlling service transmission forwards a TCP three-way handshake request received from the user equipment to the original destination server, where, in the forwarded TCP three-way handshake packet, the source address is the user equipment address, and the destination address is the original destination server address.

In addition, the forwarded three-way handshake packet carries an identifier of an uplink virtual local area network VLAN that comprises the system for controlling service transmission and the original destination server, for example, VLAN:402. The original destination server is not specifically limited, and refers to a service provider that a user equipment user needs to access. For ease of description, the forwarded TCP three-way handshake packet is referred to as a second TCP three-way handshake packet for short.

10C: When the system for controlling service transmission receives a service request (the service request includes VLAN1) of a user, 20C-30C: perform in-depth data analysis and determine a forwarding policy according to service layer information obtained through analysis, or with reference to the service layer information and dynamic information about the user, for example, identify and parse an application layer protocol. Specifically, for the HTTP protocol, a URL (HTTP domain name) may further be parsed and it is determined, with reference to user subscription information, that a service request of the user equipment needs to be forwarded to multiple service server devices for processing (in a specific implementation manner shown in FIG. 9, the service request needs to be forwarded first to a first service server for processing and then to a second service server for processing).

31C: The system for controlling service transmission disconnects or shuts down a link (Socket2) established with the original destination server and establishes, according to the TCP three-way handshake packet (first TCP three-way handshake packet) between the user equipment and the original destination server, a TCP link with the first service server and the second service server respectively (it may be interpreted as follows: constructing a new three-way handshake packet by simulating or referring to the TCP three-way handshake packet between the user equipment and the original destination server, and sending the new three-way handshake packet to the first service server, second service server, and original destination server), specifically, including:

31C1: Disconnect a link (Socket2) established with the original destination server. There may be multiple specific implementation manners. The implementation manner is implemented by sending an "RST: OIP:MS,DIP:SP,VLAN:402" message.

31C2: A system for controlling service transmission constructs a new SYN packet according to an SYN packet in a first TCP three-way handshake packet, where, in the newly constructed SYN packet, a source address is a user equipment address, and a destination address is an original server address (this information is the same as the SYN packet in the first TCP three-way handshake packet, that is, "simulating or referring to" mentioned in 31C). In addition, the newly constructed SYN packet carries an identifier of an uplink VLAN that comprises the system for controlling service transmission and the first service server. For example, the VLAN ID is 410. This helps a networked switch send the SYN packet to the first service server according to routing data of a VLAN indicated by the carried VLAN identifier (410) (all network devices need to forward a packet through a switch). The first service server is a transparent proxy device, and after being processed, the SYN packet is transparently sent back to the system for controlling service transmission through a downlink virtual local area network VLAN411, where 411 is the identifier of the downlink VLAN that comprises the system for controlling service transmission and the first service server.

31C3: The system for controlling service transmission constructs another new SYN packet according to a previously determined forwarding policy, that is, forwarding the SYN packet to a second service server. The SYN packet includes an identifier 412 of an uplink virtual local area network that comprises the system for controlling service transmission and the second service server, so that a networked switch sends the SYN packet to the second service server according to routing data of the VLAN. In the SYN packet, a source address is a user equipment address, and a destination address is an original destination server address (this information is the same as the SYN packet in the first TCP three-way handshake packet, that is, "simulating or referring to" mentioned in step 31C). The second service server is a transparent proxy device, and after being processed, the SYN packet is transparently sent back to the system for controlling service transmission through a downlink virtual local area network VLAN413 that comprises the system for controlling service transmission and the second service server.

31C4: The system for controlling service transmission constructs a new SYN packet (SYN: OIP:MS,DIP:SP,VLAN:402) according to a previously determined forwarding policy and forwards the new SYN packet to an original destination server through VLAN402 (that is, according to routing data of the VLAN 402). The original destination server returns an SYN ACK packet to the system for controlling service transmission through VLAN402.

31C5: The system for controlling service transmission constructs a new SYN ACK packet (SYN ACK: OIP:MS, DIP:SP,VLAN:410) according to the received SYN ACK packet and forwards the new SYN ACK packet to the first service server through VLAN 410 (that is, according to routing data of the VLAN 410). After processing, the first service server forwards the SYN ACK packet (SYN ACK: OIP:MS,DIP:SP,VLAN:411) back to the system for controlling service transmission through VLAN411 (that is, according to routing data of VLAN 411).

31C6: The system for controlling service transmission constructs an SYN ACK packet (SYN ACK: OIP:MS,DIP:SP,VLAN:412) according to a previously determined forwarding policy and forwards the SYN ACK packet to the second service server through VLAN412 (that is, according to routing data of VLAN 412). After processing the SYN ACK packet, the second service server sends the SYN ACK packet (SYN ACK: OIP:MS,DIP:SP,VLAN:413) to the system for controlling service transmission through VLAN413 (that is, according to routing data of VLAN 413).

A person skilled in the art may understand that, in each SYN ACK packet, a source address is a user equipment address, and a destination address is an original destination server address (this information is the same as the SYN ACK packet in the TCP three-way handshake packet between the user equipment and the original destination server, that is, "simulating or referring to" mentioned in step 31C). In addition, each SYN ACK packet carries an identifier (for example, 412 and 413) of a VLAN that comprises the system for controlling service transmission and the second service server.

31C7: After receiving the SYN ACK packet, the system for controlling service transmission ends the SYN ACK packet (that is, discard the packet and no longer send the packet), constructs an ACK packet (ACK: OIP:MS,DIP:SP, VLAN:410), and forwards the ACK packet to the first service server through VLAN 410. After processing the ACK packet, the first service server returns the ACK packet (ACK: OIP:MS,DIP:SP,VLAN:411) to the system for controlling service transmission through VLAN 411.

31C8: Similarly, the system for controlling service transmission constructs an ACK packet (ACK: OIP:MS,DIP:SP, VLAN:412) and sends the ACK packet to the second service server through VLAN 413. After processing the ACK packet, the second service server sends the ACK packet (ACK: OIP:MS,DIP:SP,VLAN: 413) to the system for controlling service transmission through VLAN 413.

31C9: The system for controlling service transmission constructs an ACK packet (ACK: OIP:MS,DIP:SP,VLAN: 402) and sends the ACK packet to the original destination server through VLAN402.

40C: After a TCP link is established between the system for controlling service transmission and the first service server and the second service server in step 31C, the system for controlling service transmission forwards a first service request received from a user to the first service server and the second service server for processing, and then sends the processed first service request to the original destination server, specifically, including:

40C1: The system for controlling service transmission forwards the first service request (carrying VLAN:410) received from the user equipment to the first service server. After performing service processing, the first service server generates a second service request (carrying VLAN:411) according to the first service request received from the user and sends the second service request back to the system for controlling service transmission.

40C2: The system for controlling service transmission forwards the received second service request (carrying VLAN:412) that is processed by the first service server to the second service server. After performing service processing, the second service server generates a third service request and sends the third service request (carrying VLAN:413) back to the system for controlling service transmission.

40C3: The system for controlling service transmission sends the third service request (carrying VLAN:402) to the original destination server and receives a first response packet (carrying VLAN:402) sent by the original destination server.

40C4: The system for controlling service transmission forwards the first response packet (carrying VLAN:412) to the second service server. After performing service processing, the second service server generates a second response packet according to the first response packet. The system for controlling service transmission receives the second response packet (carrying VLAN:413) returned by the second service server.

40C5: The system for controlling service transmission sends the received second response packet (carrying VLAN: 410) to the first service server. After performing service processing, the first service server generates a third response packet according to the second response packet. The system for controlling service transmission receives the third response packet (carrying VLAN:411) processed and returned by the first service server.

40C6: The system for controlling service transmission forwards the third response packet processed and returned by the first service server to the user equipment.

As previously mentioned, the system for controlling service transmission may use the foregoing PCC architecture and use a dynamic interface mode or a static interface mode to implement related sections 10-40 in the foregoing solutions. The system for controlling service transmission includes a PCEF and a PCRF, where the PCEF mainly implements a receiving section, an obtaining section, and a control executing section. A forwarding policy determining section is completed by the PCEF and the PCEF in cooperation. For the system architecture, reference may be made to FIG. 5*b* and FIG. 5*c*.

Optionally, a dynamic rule interface is used between the PCEF and the PCRF, including:

saving, on the PCRF, the dynamic information about the user and a policy corresponding to the dynamic information about the user, or the service layer information and a policy corresponding to the service layer information, where the policy includes forwarding the service data to at least one service server, and the at least one service server is different from the original destination server of the service data.

The foregoing receiving section and forwarding policy determining section include:

obtaining, by the PCEF, the dynamic information about the user or the service layer information of the service data;

initiating, by the PCEF, a request to the PCRF, where the request carries the dynamic information about the user or the service layer information of the service data;

querying, by the PCRF, a corresponding policy according to the dynamic information about the user or the service layer information of the service data reported by the PCEF, and sending the policy to the PCEF;

temporarily storing, by the PCEF, the received policy corresponding to the dynamic information about the user or the service layer information of the service data; and determining, by the PCEF, after receiving service data of a user, to forward the service data to at least one service server according to the dynamic information about the user or the service layer information of the service data, and the foregoing temporarily stored policy.

Optionally, the system for controlling service transmission includes the PCEF and the PCRF, and a static rule interface is used between the PCEF and the PCRF. The method includes:

configuring, locally on the PCRF, the dynamic information about the user and a policy corresponding to the dynamic information about the user, or the service layer information and a policy corresponding to the service layer information, where the policy includes forwarding the service data to at least one service server, and the at least one service server is different from the original destination server carried in the service data.

Specifically, the locally configured policy may be activated or deactivated according to an instruction of the PCRF.

Specifically, the receiving section and forwarding policy determining section include:

obtaining, by the PCEF, the dynamic information about the user or the service layer information of the service data; and determining, by the PCEF, after receiving service data of a user, to forward the service data to at least one service server according to the dynamic information about the user or the service layer information of the service data.

Figure 10:
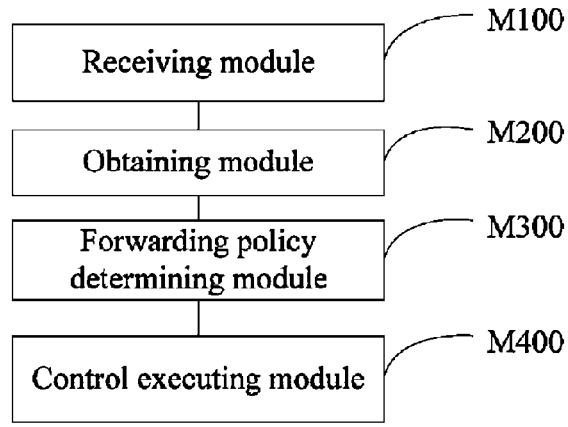
FIG. 10 is a schematic structural diagram of a system for controlling service transmission according to an implementation manner.

Correspondingly, with reference to FIG. 10, an embodiment of the present invention provides a system for controlling service transmission that may implement the foregoing methods. The system includes a receiving module (M100), an obtaining module (M200), a forwarding policy determining module (M300), and a control executing module (M400), where the modules connect to and communicate with each other.

The receiving module (M100) is configured to receive communication data sent by a piece of user equipment, where the communication data carries information about an original destination server (that is, executing the foregoing receiving section);

the obtaining module (M200) is configured to obtain, according to the communication data, any one or any combination of dynamic information about the user that sends the communication data, and service layer information of the communication data; (that is, executing the foregoing obtaining section);

the forwarding policy determining module (M300) is configured to determine a forwarding policy according to the obtained any one or any combination of the dynamic information about the user and the service layer information, where the forwarding policy includes: forwarding the service data sent by the user equipment to at least one service server, and the at least one service server is different from the original destination server carried in the communication data (that is, executing the foregoing forwarding policy determining section); and the control executing module (M400) is configured to control and execute the following procedure: sending the service data sent by the user equipment to at least one service server, receiving the service data processed by the at least one service server, and sending the received service data that has been processed to the original destination server carried in the communication data (that is, executing the foregoing control executing section).

A person skilled in the art may understand that modules shown in FIG. 10 may implement functions of method sections mentioned in the method implementation manners correspondingly. Modules may also be added, for example, a TCP protocol processing module (500) and a TCP link reconstructing module (600), to implement the functions of the steps in the foregoing method implementation manners Details are not repeatedly described herein.

Figure 11:
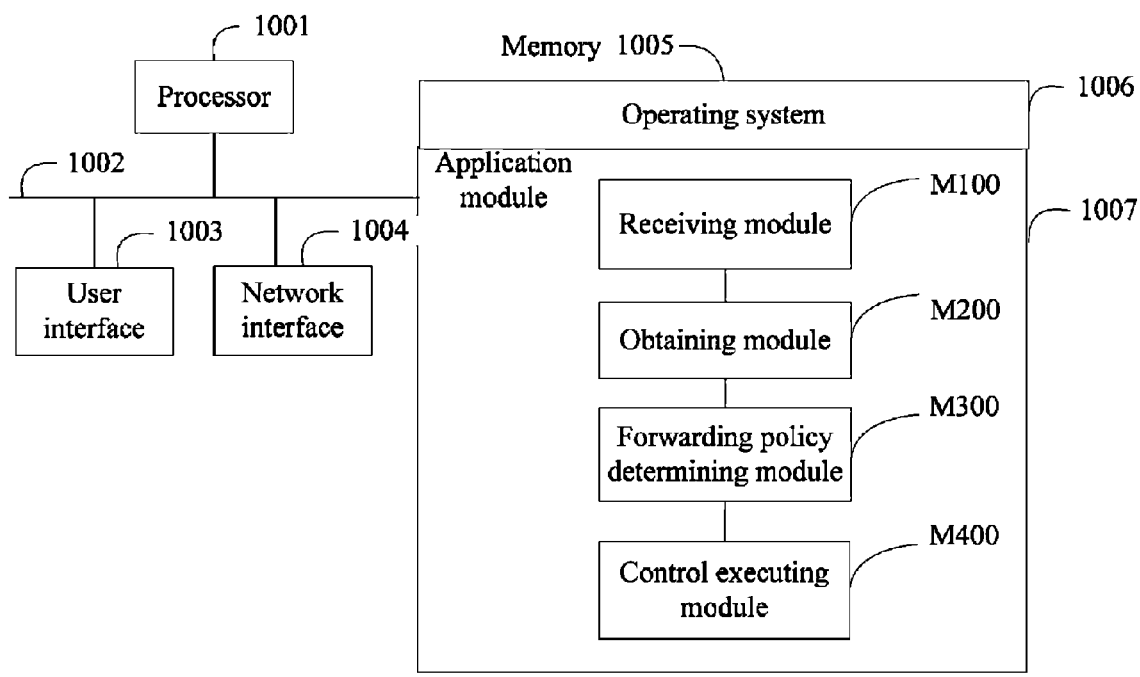
FIG. 11 is a schematic structural diagram of a system for controlling service transmission according to another implementation manner.

FIG. 11 provides a schematic structural diagram of a system for controlling service transmission that may implement each of the foregoing methods. The system for controlling service transmission includes at least one processor (1001), for example, a CPU, at least one network interface (1004) or another communication interface (1003), memory (1005), and at least one communication bus (1002). The communication bus (1002) is used to implement connection and communication between the foregoing apparatuses. Optionally, the system for controlling service transmission includes a user interface (1003), for example, a display, a keyboard, or a clicking device. The memory (1005) may include a high-speed Ram memory and may also include a non-volatile memory (non-volatile memory), for example, at least one disk memory. Optionally, the memory (1005) may include at least one memory apparatus located far away from the foregoing CPU1001. In some implementation manners, the memory (1005) stores the following elements, modules, or data structures, or their subsets, or their extension sets:

an operating system (1006), including various programs, configured to implement various basic services and process hardware-based tasks; and a receiving module (M100), an obtaining module (M200), a forwarding policy determining module (M300), and a control executing module (M400). Functions of each of the modules are as described in the foregoing. Preferably, for working principles of the foregoing modules, reference may be made to the specific description of the methods shown in FIG. 1 to FIG. 3 and FIG. 6 to FIG. 9, and details are not repeatedly described herein.

It should be understood that sequence numbers of the foregoing processes do not mean executing sequences in the embodiments of the present invention. The executing sequences of the processes shall be determined according to functions and internal logic of the processes, but not constituting any limitation on the implementation processes of the embodiments of the present invention.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling service transmission, comprising:
   receiving, by a gateway device, a service request message sent by a user equipment, wherein the service request message comprises user information of the user equipment;
   determining, according to the user information, value-added service system (VAS) information indicating at least one destination VAS for value-added processing of a service;
   receiving, by the gateway device, a first data packet of the service that is sent to the user equipment by a sending end;
   sending, by the gateway device, the first date packet of the service to the at least one destination VAS according to the VAS information;
   obtaining, by the gateway device, a second data packet from the at least one destination VAS, wherein the second data packet is a data packet obtained after the at least one destination VAS performs the value-added processing on the first data packet; and
   sending, by the gateway device, the second data packet to the user equipment.

2. The method according to claim 1, further comprising:
   obtaining status information that indicates a service status of the service; and
   wherein the VAS information is determined according to the user information and the status information.

3. The method according to claim 2, wherein obtaining the status information that indicates the service status of the service comprises obtaining first status information that indicates an initial service status of the service and the VAS information is determined according to the user information, the status information and first VAS information; and
   the method further comprises:
   determining that the initial service status changes;
   obtaining second status information that indicates the changed initiated service status of the service; and
   further determining the VAS information according to the user information by determining second VAS information.

4. The method according to claim 2, wherein the status information comprises at least one of the following:
   (a) time information indicating a current time of the service, and
   (b) bearer information indicating a current bearer network of the service.

5. The method according to claim 1, wherein the VAS information indicates at least two destination VASs of the service; and
   the obtaining a second data packet from the at least one destination VAS according to the VAS information comprises:
   sending, according to the VAS information, the first data packet to a first destination VAS;
   receiving a third data packet sent by the first destination VAS, wherein the third data packet is a data packet obtained after the first destination VAS performs the value-added processing on the first data packet;

sending, according to the VAS information, the third data packet to a second destination VAS; and receiving a data packet that is sent by the second destination VAS, and obtained after the second destination VAS performs the value-added processing on the third data packet; wherein the data packet obtained after the second destination VAS performs value-added processing on the third data packet is the second data packet; or the data packet obtained after the second destination VAS performs the value-added processing on the third data packet is sent to at least another one destination VAS as the second data packet, to enable the at least another one destination VAS to perform the value-added processing again on the data packet obtained after the second destination VAS performs the value-added processing on the third data packet, and to use the data packet obtained after the at least one another destination VAS performs the value-added processing again on the data packet, which is obtained after the second destination VAS performs the value-added processing on the third data packet.

6. The method according to claim 5, further comprising:

determining priority information that is used to indicate a sequence for sending a data packet in the at least two VASs; and the obtaining the second data packet from the at least one destination VAS according to the VAS information comprises:

obtaining, according to the VAS information and the priority information, the second data packet from the at least one destination VAS.

7. The method according to claim 1, wherein the determining the VAS information according to the user information comprises:

sending a first policy request message that comprises the user information to a policy decision server;

receiving a first policy request answer message that comprises first control information and is sent by the policy decision server, wherein the first control information is determined by the policy decision server according to the user information and indicates the VAS information; and implementing at least one of the following:

(a) determining the VAS information according to a VAS information indication identifier comprised in the first control information; and (b) obtaining the VAS information from the control information.

8. The method according to claim 2, wherein the determining the VAS information according to the user information and the status information comprises:

sending a second policy request message that comprises the user information and the status information to a policy decision server;

receiving a second policy request answer message that comprises second control information and is sent by the policy decision server, wherein the second control information is determined by the policy decision server according to the user information and the status information and is used to indicate the VAS information; and implementing at least one of the following:

(a) determining the VAS information according to a VAS information indication identifier comprised in the first control information; and (b) obtaining the VAS information from the second control information.

9. An apparatus for controlling service transmission, comprising a processor and a non-transitory processor-readable medium having processor-executable instructions stored thereon, the processor-executable instructions including a plurality of units, the units including:

a receiving unit, configured to:

receive a service request message sent by a user equipment wherein the service request message comprises user information of the user equipment;

a determining unit, configured to determine value-added service system VAS information according to the user information, wherein the VAS information indicates at least one destination VAS for value-added processing of the service;

the receiving unit, configured to further configured to receive a first data packet of the service that is sent by a sending end to the user equipment;

a sending unit, configured to send the first date packet of the service to the at least one destination VAS according to the VAS information;

an obtaining unit, configured to obtain a second data packet from the at least one destination VAS according to the VAS information, wherein the second data packet is a data packet obtained after the at least one destination VAS performs the value-added processing on the first data packet; and the sending unit further configured to send the second data packet to the user equipment.

10. The apparatus according to claim 9, wherein the determining unit is further configured to:

obtain status information that indicates a service status of the service; and determine the VAS information according to the user information and the status information.

11. The apparatus according to claim 9, wherein the determining unit is further configured to:

obtain first status information that indicates an initial service status of the service;

determine that the initial service status changes;

obtain second status information that indicates the changed initial service status of the service; and determine second VAS information according to the user information and the second status information.

12. The apparatus according to claim 10, wherein the status information obtained by the determining unit comprises at least one of the following:

(a) time information indicating a current time of the service; and (b) bearer information indicating a current bearer network of the service.

13. The apparatus according to claim 9, wherein the VAS information determined by the determining unit indicates at least two destination VASs of the service; and the obtaining unit comprises:

a sending module, configured to send the first data packet to a first destination VAS according to the VAS information;

a receiving module, configured to receive a third data packet sent by the first destination VAS, wherein the third data packet is a data packet obtained after the first destination VAS performs the value-added processing on the first data packet;

the sending module is further configured to send the third data packet to a second destination VAS according to the VAS information;

the receiving module is further configured to receive a data packet sent by the second destination VAS, wherein the data packet is obtained after the second destination VAS performs the value-added processing on the third data packet; and wherein one of the following situations exists:
(a) the data packet obtained after the second destination VAS performs the value-added processing on the third data packet is the second data packet; and
(b) the data packet obtained after the second destination VAS performs value-added processing on the third data packet is sent to at least another one destination VAS as the second data packet, to enable the at least another one destination VAS to perform the value-added processing again on the data packet obtained after the second destination VAS performs the value-added processing on the third data packet, and to use the data packet obtained after the at least one another destination VAS performs the value-added processing again on the data packet, which is obtained after the second destination VAS performs the value-added processing on the third data packet.

14. The apparatus according to claim 13, wherein the determining unit is further configured to determine priority information that indicates a sequence for sending a data packet in the at least two VASs; and
the obtaining unit is further configured to obtain, according to the VAS information and the priority information, the second data packet from the at least one destination VAS.

15. The apparatus according to claim 9, wherein the sending unit is further configured to send a first policy request message that comprises the user information to a policy decision server;

the receiving unit is further configured to receive a first policy request answer message that comprises first control information and is sent by the policy decision server, wherein the first control information is determined by the policy decision server according to the user information and indicates the VAS information; and
the determining unit is configured to implement at least one of the following:
(a) determine the VAS information according to a VAS information indication identifier comprised in the first control information; and
(b) obtaining the VAS information from the first control information.

16. The apparatus according to claim 12, wherein the sending unit is further configured to send a second policy request message that comprises the user information and the status information to a policy decision server;
the receiving unit is further configured to receive a second policy request answer message that comprises second control information and is sent by the policy decision server, wherein the second control information is determined by the policy decision server according to the user information and the status information and indicates the VAS information; and
the determining unit is configured to implement at least one of the following:
(a) determine the VAS information according to a VAS information indication identifier comprised in the first control information; and
(b) obtaining the VAS information from the second control information.

* * * * *